US012058022B2

(12) United States Patent
Miriyala et al.

(10) Patent No.: US 12,058,022 B2
(45) Date of Patent: Aug. 6, 2024

(54) ANALYSIS SYSTEM FOR SOFTWARE-DEFINED NETWORK ARCHITECTURES

(71) Applicant: Juniper Networks, Inc., Sunnyvale, CA (US)

(72) Inventors: Prasad Miriyala, San Jose, CA (US); Michael Henkel, Saratoga, CA (US); Sangyeong Kim, Berkeley, CA (US); Senthilnathan Murugappan, Fremont, CA (US); Jeffrey S. Marshall, Santa Clara, CA (US); Akhilesh Pathodia, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/146,274

(22) Filed: Dec. 23, 2022

(65) Prior Publication Data
US 2024/0214294 A1 Jun. 27, 2024

(51) Int. Cl.
| H04L 12/24 | (2006.01) |
| H04L 29/08 | (2006.01) |
| H04L 41/40 | (2022.01) |
| H04L 43/20 | (2022.01) |
| G06F 11/34 | (2006.01) |
| G06F 11/36 | (2006.01) |

(52) U.S. Cl.
CPC .............. *H04L 43/20* (2022.05); *H04L 41/40* (2022.05)

(58) Field of Classification Search
CPC ................................ H04L 41/40; H04L 43/20
USPC ....................................................... 709/223
See application file for complete search history.

(56) References Cited

U.S. PATENT DOCUMENTS

| 9,571,394 | B1 | 2/2017 | Sivaramakrishnan et al. |
| 10,915,428 | B2 * | 2/2021 | Balasubramanian ........................ G06F 11/3089 |
| 10,929,278 | B2 * | 2/2021 | Balasubramanian ........................ G06F 11/302 |
| 11,093,378 | B2 * | 8/2021 | Balasubramanian ... G06F 9/546 |
| 11,221,854 | B2 * | 1/2022 | Balasubramanian ... G06F 9/541 |

(Continued)

FOREIGN PATENT DOCUMENTS

| EP | 2859694 A1 | 4/2015 |
| WO | 2013184846 A1 | 12/2013 |

OTHER PUBLICATIONS

KN et al., "Day One: Contrail DPDK vROUTER", Engineering Simplicity, Juniper Networks, Jan. 21, 2021, 196 pp., URL: https://www.juniper.net/documentation/en_US/day-one-books/contrail-DPDK.pdf.

*Primary Examiner* — Jude Jean Gilles
(74) *Attorney, Agent, or Firm* — Shumaker & Sieffert, P.A.

(57) ABSTRACT

In general, techniques are described that provide an analysis system for analyzing a software-defined networking (SDN) architecture system. The analysis system comprising the processing circuitry configured to obtain operational data representative of one or more of configuration, operation, and maintenance of the SDN architecture system. The processing circuitry may identify dependencies between the operational data that identify dependencies between objects representative of the configuration, operation, and maintenance of the SDN architecture system. The processing circuitry may perform, while traversing the dependencies between the operational data, analysis with respect to the operational data in order to identify potential issues in the SDN architecture system, and output the potential issues in the SDN architecture system.

18 Claims, 11 Drawing Sheets

(56) References Cited

U.S. PATENT DOCUMENTS

| | | | |
|---|---|---|---|
| 11,354,222 B2* | 6/2022 | Balasubramanian | ........................ G06F 11/3672 |
| 11,379,292 B2* | 7/2022 | Balasubramanian | ........................ G06F 11/3093 |
| 2018/0137146 A1* | 5/2018 | Mayer | .................... G06F 16/284 |
| 2019/0392070 A1* | 12/2019 | Johnson | ................ G06Q 10/067 |
| 2021/0066642 A1* | 3/2021 | Lee | ........................ H10K 50/86 |
| 2021/0099282 A1* | 4/2021 | Saxena | ................. H04L 9/3239 |
| 2022/0231904 A1* | 7/2022 | Di Martino | ............. H04L 43/50 |
| 2022/0279420 A1 | 9/2022 | Akkipeddi et al. | |

* cited by examiner

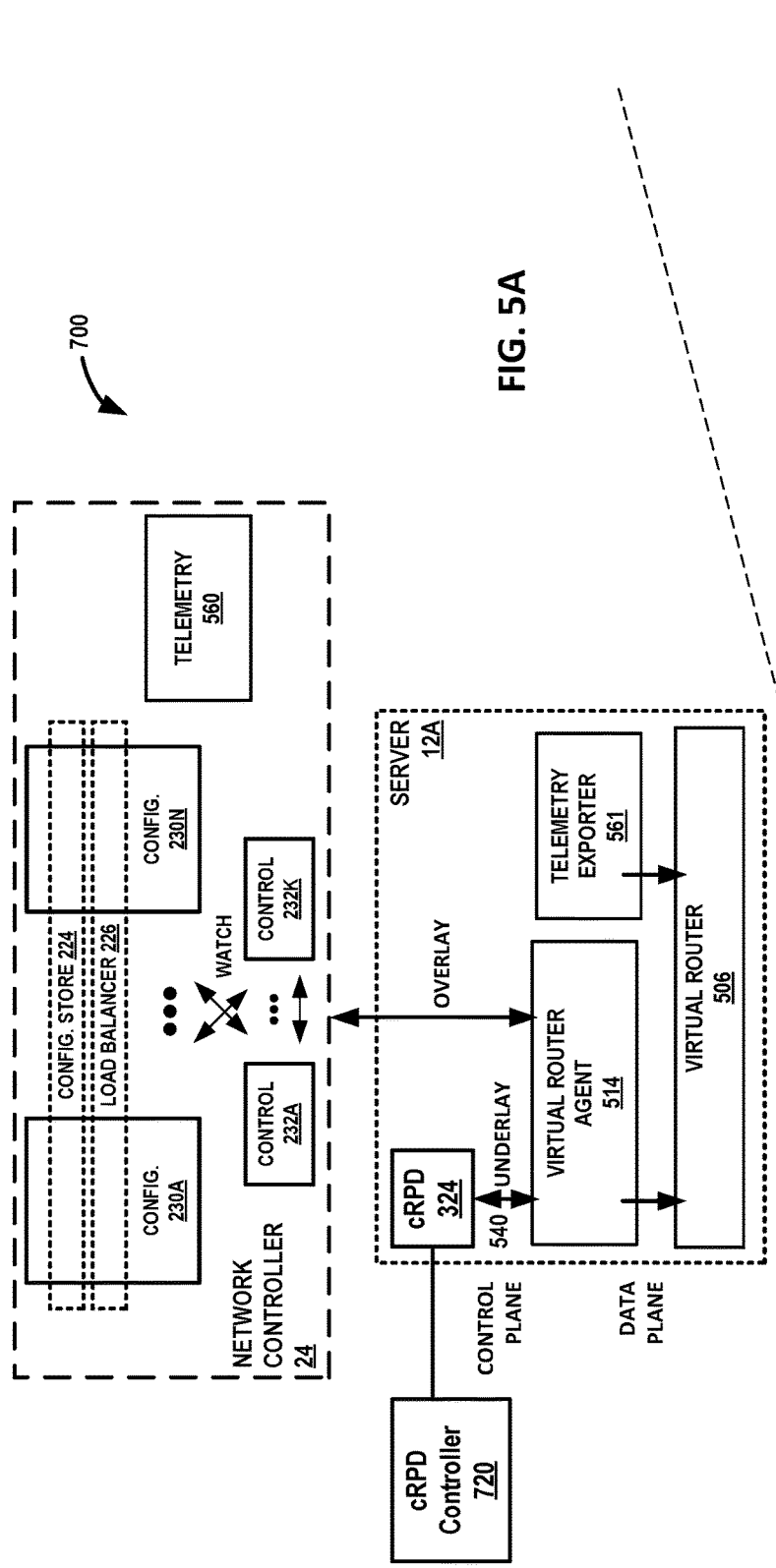
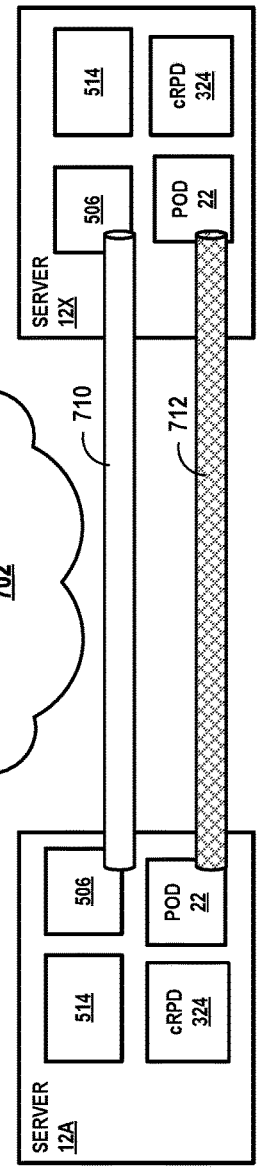
FIG. 5A
FIG. 5B

ANALYSIS SYSTEM FOR SOFTWARE-DEFINED NETWORK ARCHITECTURES

TECHNICAL FIELD

The disclosure relates to virtualized computing infrastructure and, more specifically, to cloud native networking.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such as virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers may execute consistently from one computing environment to another, virtual or physical.

With containers' inherently lightweight nature, a single host can often support many more container instances than traditional virtual machines (VMs). Often short-lived (compared to most VMs), containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

In terms of network management, the various systems supporting software-defined networking architectures may consume and/or generate a large amount of operational data, such as logs, configuration data, state data, metrics data, traces, alarms, security events, etc. Collecting and analyzing the operational data may require extensive experience working with the various systems supporting software-defined networking to troubleshoot network operation or otherwise understand whether software-defined networking is achieving intended goals. For inexperienced users, attempting to troubleshoot software-defined networking architectures may require time consuming trail-and-error and possibly support personnel to assist with any issues that occur in software-defined networking architectures.

SUMMARY

In general, techniques are described for an analysis system that performs root cause analysis with respect to software-defined networking (SDN) architecture systems. The analysis system may be configured to obtain operational data representative of a configuration, operation, and maintenance of the SDN architecture systems, which may include a number of different components directed to configuration, control, compute, and/or telemetry. The analysis system may interface with one or more of these components to collect the operational data, whereupon the analysis system may process the operational data to identify different dependencies between portions of the operational data.

In some examples, the analysis system may form a graph data structure that includes vertexes representative of the different portions of the operational data and edges defining the dependencies between the vertexes. The analysis system may next traverse the graph data structure, starting from a starting vertex (which may be selected via interactions with a chatbot or other interactive interface) and processing the portion of the operational data represented by the starting vertex. The analysis system may then traverse the edge to a dependent vertex and continue to process the portion of the operational data represented by the dependent vertex. When processing the vertexes, the analysis system may identify potential issues that may form a root cause for the SDN architecture system. The analysis system may then output the potential issues for user review to assist in troubleshooting the SDN architecture system.

The techniques may provide one or more technical advantages. For example, the techniques may enable inexperienced users to troubleshoot the SDN architecture system without having to resort to time consuming trial-and-error approaches. Through interactions with the exposed interactive interfaces, the user may define a problem currently being experienced by the SDN architecture system, which the analysis system may use when collecting the operational data and building the graph data structure. The analysis system may also determine, in some cases via interactions with the user via the interactive interface, how to traverse the graph data structure in order to identify the root cause of a problem identified by the user.

The analysis system may, in this way, improve operation of the SDN architecture system by providing interactive assistance to the user that may mitigate trail-and-error approaches to troubleshooting the problem. By reducing time (and possibly actions) required to identify the issue, the user may more efficiently address various problems and/or issues in the SDN architecture system and thereby return the SDN architecture system to more efficient operation. As such, the analysis system may itself require less computing resources (e.g., processing cycles, memory, memory bus bandwidth, etc. and corresponding power) in facilitating interactive troubleshooting of potential issues in the SDN architecture system (compared to non-expert system approaches).

In one example, various aspects of the techniques are directed to an analysis system for a software-defined networking (SDN) architecture system, the analysis system comprising: processing circuitry configured to: obtain operational data representative of one or more of configuration, operation, and maintenance of the SDN architecture system; identify dependencies between the operational data that identify dependencies between objects representative of the configuration, operation, and maintenance of the SDN architecture system; perform, while traversing the dependences between the operational data, analysis with respect to the operational data in order to identify potential issues in the SDN architecture system; and output the potential issues in the SDN architecture system.

In another example, various aspects of the techniques are directed to a method for an analysis node configured to analyze a software-defined networking (SDN) architecture system, the method comprising: obtaining, by processing circuitry, operational data representative of one or more of configuration, operation, and maintenance of the SDN architecture system; identifying, by the processing circuitry, dependencies between the operational data that identify dependencies between the configuration, operation, and maintenance of the SDN architecture system; performing, by the processing circuitry and while traversing the dependences between the operational data, analysis with respect to the operational data in order to identify potential issues in the SDN architecture system; and outputting, by the processing circuitry, the potential issues in the SDN architecture system.

In another example, various aspects of the techniques are directed to a non-transitory computer-readable storage medium having instructions stored thereon that, when executed, cause one or more processors of an analysis node for analyzing a software-defined networking (SDN) architecture system to: obtain operational data representative of one or more of configuration, operation, and maintenance of the SDN architecture system; identify dependencies between the operational data that identify dependencies between the configuration, operation, and maintenance of the SDN architecture system; perform, while traversing the dependences between the operational data, analysis with respect to the operational data in order to identify potential issues in the SDN architecture system; and output the potential issues in the SDN architecture system.

The details of one or more examples of this disclosure are set forth in the accompanying drawings and the description below. Other features, objects, and advantages will be apparent from the description and drawings, and from the claims.

BRIEF DESCRIPTION OF DRAWINGS

FIG. 5A is a block diagram illustrating control/routing planes for underlay network and overlay network configuration using an SDN architecture, according to techniques of this disclosure.

FIG. 5B is a block diagram illustrating a configured virtual network to connect pods using a tunnel configured in the underlay network, according to techniques of this disclosure.

Like reference characters denote like elements throughout the description and figures.

DETAILED DESCRIPTION

Figure 1:
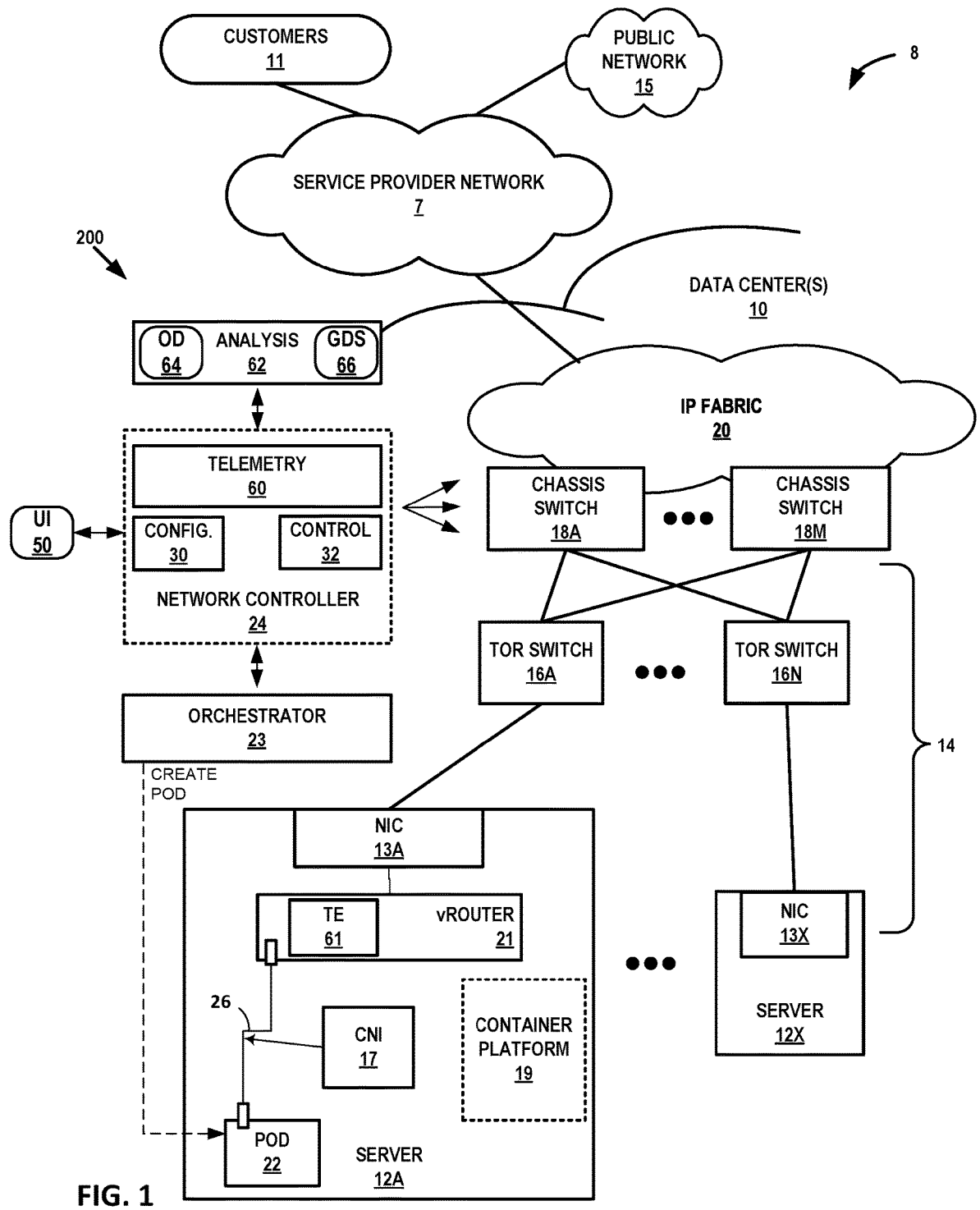
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. Current implementations of software-defined networking (SDN) architectures for virtual networks present challenges for cloud native adoption due to, e.g., complexity in life cycle management, a mandatory high resource analytics component, scale limitations in configuration modules, and no command-line interface (CLI)-based (kubectl-like) interface. Computing infrastructure 8 includes a cloud native SDN architecture system, as an example described herein, that addresses these challenges and modernizes for the telco cloud native era. Example use cases for the cloud native SDN architecture include 5G mobile networks as well as cloud and enterprise cloud native use cases. An SDN architecture may include data plane elements implemented in compute nodes (e.g., servers 12) and network devices such as routers or switches, and the SDN architecture may also include an SDN controller (e.g., network controller 24) for creating and managing virtual networks. The SDN architecture configuration and control planes are designed as scale-out cloud native software with a container-based microservices architecture that supports in-service upgrades.

As a result, the SDN architecture components are microservices and, in contrast to existing network controllers, the SDN architecture assumes a base container orchestration platform to manage the lifecycle of SDN architecture components. A container orchestration platform is used to bring up SDN architecture components; the SDN architecture uses cloud native monitoring tools that can integrate with customer provided cloud native options; the SDN architecture provides a declarative way of resources using aggregation APIs for SDN architecture objects (i.e., custom resources). The SDN architecture upgrade may follow cloud native patterns, and the SDN architecture may leverage Kubernetes constructs such as Multus, Authentication & Authorization, Cluster API, KubeFederation, KubeVirt, and Kata containers. The SDN architecture may support data plane development kit (DPDK) pods, and the SDN architecture can extend to support Kubernetes with virtual network policies and global security policies.

For service providers and enterprises, the SDN architecture automates network resource provisioning and orchestration to dynamically create highly scalable virtual networks and to chain virtualized network functions (VNFs) and physical network functions (PNFs) to form differentiated service chains on demand. The SDN architecture may be integrated with orchestration platforms (e.g., orchestrator 23) such as Kubernetes, OpenShift, Mesos, OpenStack, VMware vSphere, and with service provider operations support systems/business support systems (OS SB SS).

In general, one or more data center(s) 10 provide an operating environment for applications and services for customer sites 11 (illustrated as "customers 11") having one or more customer networks coupled to the data center by service provider network 7. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

In this example, data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "compute nodes," "hosts," or "host devices." Although only server 12A coupled to TOR switch 16A is shown in detail in FIG. 1, data center 10 may include many additional servers coupled to other TOR switches 16 of data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21 (illustrated as and also referred to herein as "vRouter 21"), virtual routers running in servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines ("VMs"). A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent application workloads.

As shown in FIG. 1, server 12A hosts one virtual network endpoint in the form of pod 22 having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-My specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21.

As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions.

In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of network interface card 13A of the server but also a virtual network identifier such as a VxLAN tag or Multiprotocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22), virtual router 21 attaches a tunnel encapsulation header indicating the virtual network for the packet to generate an encapsulated or "tunnel" packet, and virtual router 21 outputs the encapsulated packet via overlay tunnels for the virtual networks to a physical destination computing device, such as another one of servers 12. As used herein, virtual router 21 may execute the operations of a tunnel endpoint to encapsulate inner packets sourced by virtual network endpoints to generate tunnel packets and decapsulate tunnel packets to obtain inner packets for routing to other virtual network endpoints.

In some examples, virtual router 21 may be kernel-based and execute as part of the kernel of an operating system of server 12A. In some examples, virtual router 21 may be a Data Plane Development Kit (DPDK)-enabled virtual router. In such examples, virtual router 21 uses DPDK as a data plane. In this mode, virtual router 21 runs as a user space application that is linked to the DPDK library (not shown). This is a performance version of a virtual router and is commonly used by telecommunications companies, where the VNFs are often DPDK-based applications. The performance of virtual router 21 as a DPDK virtual router can achieve ten times higher throughput than a virtual router operating as a kernel-based virtual router. The physical interface is used by DPDK's poll mode drivers (PMDs) instead of Linux kernel's interrupt-based drivers.

A user-I/O (UIO) kernel module, such as vfio or uiopci generic, may be used to expose a physical network interface's registers into user space so that they are accessible by the DPDK PMD. When NIC 13A is bound to a UIO driver, it is moved from Linux kernel space to user space and therefore no longer managed nor visible by the Linux OS. Consequently, it is the DPDK application (i.e., virtual router 21A in this example) that fully manages NIC 13. This includes packets polling, packets processing, and packets forwarding. User packet processing steps may be performed by virtual router 21 DPDK data plane with limited or no participation by the kernel (where the kernel not shown in FIG. 1). The nature of this "polling mode" makes the virtual router 21 DPDK data plane packet processing/forwarding much more efficient as compared to the interrupt mode, particularly when the packet rate is high. There are limited or no interrupts and context switching during packet I/O. Additional details of an example of a DPDK vRouter are found in "DAY ONE: CONTRAIL DPDK vROUTER," 2021, Kiran K N et al., Juniper Networks, Inc., which is incorporated by reference herein in its entirety.

Computing infrastructure 8 implements an automation platform for automating deployment, scaling, and operations of virtual execution elements across servers 12 to provide virtualized infrastructure for executing application workloads and services. In some examples, the platform may be a container orchestration system that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration may facilitate container coordination and refers to the deployment, management, scaling, and configuration, e.g., of containers to host servers by a container orchestration platform. Example instances of orchestration platforms include Kubernetes (a container orchestration system), Docker swarm, Mesos/Marathon, OpenShift, OpenStack, VMware, and Amazon ECS.

Elements of the automation platform of computing infrastructure 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes.

Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding example operations of a network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "TUNNELED PACKET AGGREGATION FOR VIRTUAL NETWORKS," each which is incorporated by reference as if fully set forth herein.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform. Example components of a Kubernetes orchestration system are described below with respect to FIG. 3.

In one example, pod 22 is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22 is an example of a virtual execution element. Containers of a pod are always co-located on a single server, co-scheduled, and run in a shared context. The shared context of a pod may be a set of Linux namespaces, cgroups, and other facets of isolation.

Within the context of a pod, individual applications might have further sub-isolations applied. Typically, containers within a pod have a common IP address and port space and are able to detect one another via the localhost. Because they have a shared context, containers within a pod may also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19 for running containerized applications, such as those of pod 22. Container platform 19 receives requests from orchestrator 23 to obtain and host, in server 12A, containers. Container platform 19 obtains and executes the containers.

Container network interface (CNI) 17 configures virtual network interfaces for virtual network endpoints. The orchestrator 23 and container platform 19 use CNI 17 to manage networking for pods, including pod 22. For example, CNI 17 creates virtual network interfaces to connect pods to virtual router 21 and enables containers of such pods to communicate, via the virtual network interfaces, to other virtual network endpoints over the virtual networks. CNI 17 may, for example, insert a virtual network interface for a virtual network into the network namespace for containers in pod 22 and configure (or request to configure) the virtual network interface for the virtual network in virtual router 21 such that virtual router 21 is configured to send packets received from the virtual network via the virtual network interface to containers of pod 22 and to send packets received via the virtual network interface from containers of pod 22 on the virtual network. CNI 17 may assign a network address (e.g., a virtual IP address for the virtual network) and may set up routes for the virtual network interface.

In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network CNI 17 may represent a library, a plugin, a module, a runtime, or other executable code for server 12A. CNI 17 may conform, at least in part, to the Container Network Interface (CNI) specification or the rkt Networking Proposal. CNI 17 may represent a Contrail, OpenContrail, Multus, Calico, cRPD, or other CNI. CNI 17 may alternatively be referred to as a network plugin or CNI plugin or CNI instance. Separate CNIs may be invoked by, e.g., a Multus CNI to establish different virtual network interfaces for pod 22.

CNI 17 may be invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

Pod 22 includes one or more containers. In some examples, pod 22 includes a containerized DPDK workload that is designed to use DPDK to accelerate packet processing, e.g., by exchanging data with other components using DPDK libraries. Virtual router 21 may execute as a containerized DPDK workload in some examples.

Pod 22 is configured with virtual network interface 26 for sending and receiving packets with virtual router 21. Virtual network interface 26 may be a default interface for pod 22. Pod 22 may implement virtual network interface 26 as an Ethernet interface (e.g., named "eth0") while virtual router 21 may implement virtual network interface 26 as a tap interface, virtio-user interface, or other type of interface.

Pod 22 and virtual router 21 exchange data packets using virtual network interface 26. Virtual network interface 26 may be a DPDK interface. Pod 22 and virtual router 21 may set up virtual network interface 26 using vhost. Pod 22 may operate according to an aggregation model. Pod 22 may use a virtual device, such as a virtio device with a vhost-user adapter, for user space container inter-process communication for virtual network interface 26.

CNI 17 may configure, for pod 22, in conjunction with one or more other components shown in FIG. 1, virtual network interface 26. Any of the containers of pod 22 may utilize, i.e., share, virtual network interface 26 of pod 22.

Virtual network interface 26 may represent a virtual ethernet ("veth") pair, where each end of the pair is a separate device (e.g., a Linux/Unix device), with one end of the pair assigned to pod 22 and one end of the pair assigned to virtual router 21. The veth pair or an end of a veth pair are sometimes referred to as "ports". A virtual network interface may represent a macvlan network with media access control (MAC) addresses assigned to pod 22 and to virtual router 21 for communications between containers of pod 22 and virtual router 21. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22 is a virtual network endpoint in one or more virtual networks. Orchestrator 23 may store or otherwise manage configuration data for application deployments that specifies a virtual network and specifies that pod 22 (or the one or more containers therein) is a virtual network endpoint of the virtual network.

Orchestrator 23 may receive the configuration data from a user, operator/administrator, or other computing system, for instance.

As part of the process of creating pod 22, orchestrator 23 requests that network controller 24 create respective virtual network interfaces for one or more virtual networks (indicated in the configuration data). Pod 22 may have a different virtual network interface for each virtual network to which it belongs. For example, virtual network interface 26 may be a virtual network interface for a particular virtual network. Additional virtual network interfaces (not shown) may be configured for other virtual networks.

Network controller 24 processes the request to generate interface configuration data for virtual network interfaces for the pod 22. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

Network controller 24 sends interface configuration data to server 12A and, more specifically in some cases, to virtual router 21. To configure a virtual network interface for pod 22, orchestrator 23 may invoke CNI 17. CNI 17 obtains the interface configuration data from virtual router 21 and processes it. CNI 17 creates each virtual network interface specified in the interface configuration data. For example, CNI 17 may attach one end of a veth pair implementing management interface 26 to virtual router 21 and may attach the other end of the same veth pair to pod 22, which may implement it using virtio-user.

The following is example interface configuration data for pod 22 for virtual network interface 26.

```
[{
    // virtual network interface 26
    "id": "fe4bab62-a716-11e8-abd5-0cc47a698428",
    "instance-id": "fe3edca5-a716-11e8-822c-0cc47a698428",
    "ip-address": "10.47.255.250",
    "plen": 12,
    "vn-id": "56dda39c-5e99-4a28-855e-6ce378982888",
    "vm-project-id": "00000000-0000-0000-0000-000000000000",
    "mac-address": "02:fe:4b:ab:62:a7",
    "system-name": "tapeth0fe3edca",
    "rx-vlan-id": 65535,
    "tx-vlan-id": 65535,
    "vhostuser-mode": 0,
    "v6-ip-address": "::",
    "v6-plen":,
    "v6-dns-server": "::",
    "v6-gateway": "::",
    "dns-server": "10.47.255.253",
    "gateway": "10.47.255.254",
    "author": "/usr/bin/contrail-vrouter-agent",
    "time": "426404:56:19.863169"
}]
```

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

Network controller 24 is a cloud native, distributed network controller for software-defined networking (SDN) that is implemented using one or more configuration nodes 30 and one or more control nodes 32 along with one or more telemetry nodes 60. Each of configuration nodes 30 may itself be implemented using one or more cloud native, component microservices. Each of control nodes 32 may itself be implemented using one or more cloud native, component microservices. Each of telemetry nodes 60 may also itself be implemented using one or more cloud native, component microservices.

In some examples, configuration nodes 30 may be implemented by extending the native orchestration platform to support custom resources for the orchestration platform for software-defined networking and, more specifically, for providing northbound interfaces to orchestration platforms to support intent-driven/declarative creation and managing of virtual networks by, for instance, configuring virtual network interfaces for virtual execution elements, configuring underlay networks connecting servers 12, configuring overlay routing functionality including overlay tunnels for the virtual networks and overlay trees for multicast layer 2 and layer 3.

Network controller 24, as part of the SDN architecture illustrated in FIG. 1, may be multi-tenant aware and support multi-tenancy for orchestration platforms. For example, network controller 24 may support Kubernetes Role Based Access Control (RBAC) constructs, local identity access management (IAM) and external IAM integrations. Network controller 24 may also support Kubernetes-defined networking constructs and advanced networking features like virtual networking, BGPaaS, networking policies, service chaining and other telco features. Network controller 24 may support network isolation using virtual network constructs and support layer 3 networking.

To interconnect multiple virtual networks, network controller 24 may use (and configure in the underlay and/or virtual routers 21) import and export policies that are defined using a Virtual Network Router (VNR) resource. The Virtual Network Router resource may be used to define connectivity among virtual networks by configuring import and export of routing information among respective routing instances used to implement the virtual networks in the SDN architecture. A single network controller 24 may support multiple Kubernetes clusters, and VNR thus allows connecting multiple virtual networks in a namespace, virtual networks in different namespaces, Kubernetes clusters, and across Kubernetes clusters. VNR may also extend to support virtual network connectivity across multiple instances of network controller 24. VNR may alternatively be referred to herein as Virtual Network Policy (VNP) or Virtual Network Topology. As shown in the example of FIG. 1, network controller 24 may maintain configuration data (e.g., config. 30) representative of virtual networks ("VNs") that represent policies and other configuration data for establishing VNs within data centers 10 over the physical underlay network and/or virtual routers, such as virtual router 21 ("vRouter 21").

A user, such as an administrator, may interact with UI 50 of network controller 24 to define the VNs. In some instances, UI 50 represents a graphical user interface (GUI) that facilitate entry of the configuration data that defines VNs. In other instances, UI 50 may represent a command line interface (CLI) or other type of interface. Assuming that UI 50 represents a graphical user interface, the administrator may define VNs by arranging graphical elements representative of different pods, such as pod 22, to associate pods with VNs, where any of VNs enables communications among one or more pods assigned to that VN.

In this respect, an administrator may understand Kubernetes or other orchestration platforms but not fully understand the underlying infrastructure that supports VNs. Some controller architectures, such as Contrail, may configure VNs based on networking protocols that are similar, if not substantially similar, to routing protocols in traditional physical networks. For example, Contrail may utilize concepts from a border gateway protocol (BGP), which is a routing protocol used for communicating routing information within so-called autonomous systems (ASes) and sometimes between ASes.

There are different versions of BGP, such as internal BGP (iBGP) for communicating routing information within ASes, and external BGP (eBGP) for communicating routing information between ASes. ASes may be related to the concept of projects within Contrail, which is also similar to namespaces in Kubernetes. In each instance of AS, projects, and namespaces, an AS, like projects, and namespaces may represent a collection of one or more networks (e.g., one or more of VNs) that may share routing information and thereby facilitate interconnectivity between networks (or, in this instances, VNs).

To facilitate management of VNs, pods (or clusters), other physical and/or virtual components, etc., network controller 24 may provide telemetry nodes 60 that interface with various telemetry exporters (TEs) deployed within SDN architecture 8, such as TE 61 deployed at virtual router 21. While shown as including a single TE 62, network controller 24 may deploy TEs throughout SDN architecture 8, such as at various servers 12 (such as shown in the example of FIG. 1 with TE 61 deployed within virtual router 21), TOR switches 16, chassis switches 18, orchestrator 23, etc.

TEs, including TE 61, may obtain different forms of metric data. For example, TEs may obtain system logs (e.g., system log messages regarding informational and debug conditions) and object log (e.g., object log messages denoted records of changes made to system objects, such as VMs, VNs, service instances, virtual router, BGP peers, routing instances, and the like). TEs may also obtain trace messages that define records of activities collected locally by software components and sent to analytics nodes (potentially only on demand), statistics information related to flows, CPU and memory usage, and the like, as well as metrics that are defined as time series data with key, value pair having labels attached.

TEs may export some portion of, or potentially all of, this metric data back to telemetry nodes 60 for review via, as an example, UI 50, where metrics data is represented in part as operational data (OD) 64 ("OD 64"). An administrator or other network operator/user may review OD 64 to better understand and manage operation of virtual and/or physical components of SDN architecture 8, perform troubleshooting and/or debugging of virtual and/or physical components of SDN architecture 8, etc. OD 64 may also include any data representative of one or more of configuration (e.g., a configuration map defining configuration data), operation (such as metrics data), and maintenance (e.g., metrics data).

Given the complexity of SDN architecture 8 in terms of physical underlay network, virtual overlay network, various abstractions in terms of virtual networks, virtual routers, etc., a large amount of operational data (OD) 64 may be sourced to facilitate a better understanding of how SDN architecture 8 is operating. In some instances, network controller 24 may not collect all OD 64 (e.g., to limit resource utilization within SDN architecture 8). Moreover, the administrator or other user may not understand how to traverse OD 64 in order to troubleshoot operation of SDN architecture 8.

In terms of network management, the various systems (such as those supporting network controller 24—e.g., configuration node 30, control node 32, telemetry node 60, etc.—orchestrator 23, etc.) supporting SDN architecture 8 may consume and/or generate a large amount of OD 64, such as logs, configuration data, state data, metrics data, traces, alarms, security events, etc. Collecting and analyzing OD 64 may require extensive experience working with the various systems supporting software-defined networking to troubleshoot network operation or otherwise understand whether software-defined networking is achieving intended goals. For inexperienced users, attempting to troubleshoot SDN architecture 8 may require time consuming trail-and-error and possibly support personnel (e.g., technical support provided by the manufacturer of various systems supporting SDN architecture 8) to assist with any issues that occur in SDN architecture 8.

In accordance with various aspects of the techniques described in this disclosure, SDN architecture 8 may provide an analysis system 62 (which may also be referred to as an analysis node 62 and is shown in the example of FIG. 1 as "analysis 62") that performs root cause analysis with respect to SDN architecture 8. Analysis system 62 may be configured to obtain OD 64 through interactions with network controller 24, where again OD 62 may represent data indicative of configuration, operation, and maintenance of the SDN architecture 8. SDN architecture 8 may include a number of different components directed to configuration 30, control 32, compute, and/or telemetry 60. Analysis system 62 may interface with one or more of these components 30, 32, 60, etc. to collect OD 62, whereupon analysis system 62 may process OD 64 to identify different dependencies between portions of OD 64.

In some examples, analysis system 62 may form a graph data structure (GDS) 66 ("GDS 66") that includes vertexes representative of the different portions of OD 64 and edges defining the dependencies between the vertexes. Analysis system 62 may next traverse GDS 66 starting from a starting vertex (which may be selected via interactions with a chatbot or other interactive interface, such as a graphical user interface—GUI—that represents GDS 66 graphically), processing the portion of OD 64 represented by the starting vertex. Analysis system 62 may then traverse the edge to a dependent vertex and continue to process the portion of OD 64 represented by the dependent vertex. When processing the vertexes, analysis system 62 may identify potential issues that may form a root cause for potential issues impacting SDN architecture 8. Analysis system 62 may then output (e.g., via UI 50 by way of network controller 24) the potential issues for user review to assist in troubleshooting SDN architecture 8.

In operation, analysis system 62 may obtain OD 64 representative of one or more of configuration, operation, and maintenance of the SDN architecture 8. For example, SDN architecture 8 may support a first virtual network (denoted "VN1" for purposes of example) in which there is a potential routing issue impacting connectivity between nodes and/or pods interfacing with the VN1. Via UI 50, the user may interface with network controller 24 to initiate a root cause analysis with respect to the VN1. Network controller 24 may invoke analysis system 8 to perform the root cause analysis, passing VN1 as having potential issues.

Analysis system 8 may, responsive to receiving VN1, interface with network controller 24 to collect OD 64 concerning VN1, including a configuration map defining how VN1 is configured. Analysis system 62 may also interface with telemetry node 60 to obtain additional OD 64 in the form of metric data representative of operation and maintenance of VN1. Analysis system 62 may also interface with control node 32 to obtain additional OD 64 in control data representative of control information provided with respect to VN1 (such as routing information to enable various nodes and/or pods to support VN1).

Analysis system 62 may next identify dependencies between OD 64 that identify dependencies between the configuration, operation, and maintenance of SDN architecture 8. Analysis system 62 construct GDS 66 to define the dependencies between various portions of OD 64. Given that a number of different aspects of configuration data within OD 64 may be schema objects in which dependencies were previously defined when configuring (in this example) VN1. Analysis system 62 may then construct GDS 66 based on the schema objects to add dependencies (which are edges in terms of GDS 66) between various vertexes representative of portions of OD 64.

In some instances, the user and/or analysis system 62 may define dependency limits to how many dependencies should be included in GDS 66 in order to limit and/or reduce a size of GDS 66. Analysis system 62 may include templates that define these dependency limits based on a type of potential issue impacting SDN architecture 8. In this example of potential routing issues in VN1, analysis system 62 may define a limit of one or two dependencies, where such dependency limits may be premised on past manual inspection of potential issues with VNs executing within SDN architectures (which may include SDN architecture 8).

After constructing GDS 66, analysis system 62 may then perform, while traversing the dependences between OD 64, analysis with respect to OD 64 in order to identify potential issues SDN architecture 8 (which in this instance are specific to VN1). Analysis system 62 may traverse vertexes of GDS 66 via the edges (representative of the dependencies) in a defined walk. The user may interface with UI 50 to specify how analysis system 62 is to traverse (or, in other words, "walk") GDS 66. In addition or as an alternative, analysis system 62 may traverse GDS 66 according to the templates defined above, which may specify a starting vertex that should form the start of the traversal of GDS 66.

When traversing GDS 66, analysis system 62 may perform a number of different types of verification. Analysis system 62 may process one or more vertexes of GDS 66 representative of a portion of OD 64 to perform configuration verification that verifies all configuration nodes, control nodes, and/or compute nodes relevant to VN1. Analysis system 62 may also perform operational state verification with respect to one or more vertexes of GDS 66 to verify an operational state of control nodes, compute nodes, etc. in terms of states, errors, metrics data, monitoring data, global monitoring data for SDN architecture 8, and any other operational data relevant to VN1. Analysis system 62 may also perform analytics verification to ensure that various UVEs, object logs, and/or metrics data relevant to VN1 are within various analytical thresholds. Via these various types of verification, analysis system 62 may identify configuration errors, control errors, operational errors (e.g., potentially based on analytics data, such as object logs, metrics data, etc.). These errors may represent potential issues in SDN architecture 8 that, in this instance, are possibly impacting VN1.

Analysis system 62 may then interface with network controller 24, passing the potential issues to network controller 24. Network controller 24 may then output (e.g., via UI 50) the potential issues in the SDN architecture 8 (which in this example may relate to VN1).

In this way, the techniques may improve operation of SDN architecture 8 by enabling inexperienced users to troubleshoot SDN architecture 8 without having to resort to time consuming trial-and-error approaches. Through interactions with the exposed interactive interfaces (e.g., UI 50), the user may define a problem currently being experienced by the SDN architecture 8, which analysis system 62 may use when collecting OD 64 and building GDS 66. Analysis system 62 may also determine, possibly via interactions with the user via the interactive interface (e.g., UI 50), how to traverse GDS 66 in order to identify the root cause of the problem identified by the user.

Analysis system 62 may, in this way, improve operation of SDN architecture 8 by providing interactive assistance to the user that may mitigate trail-and-error approaches to troubleshooting the problem. By reducing time (and possibly actions) required to identify the issue, the user may more efficiently address various problems and/or issues in the SDN architecture 8 and thereby return SDN architecture 8 to more efficient operation. As such, analysis system 62 may operate as an expert system that itself requires less computing resources (e.g., processing cycles, memory, memory bus bandwidth, etc. and corresponding power) in facilitating interactive troubleshooting of potential issues in SDN architecture 8 (compared to non-expert system approaches).

Figure 2:
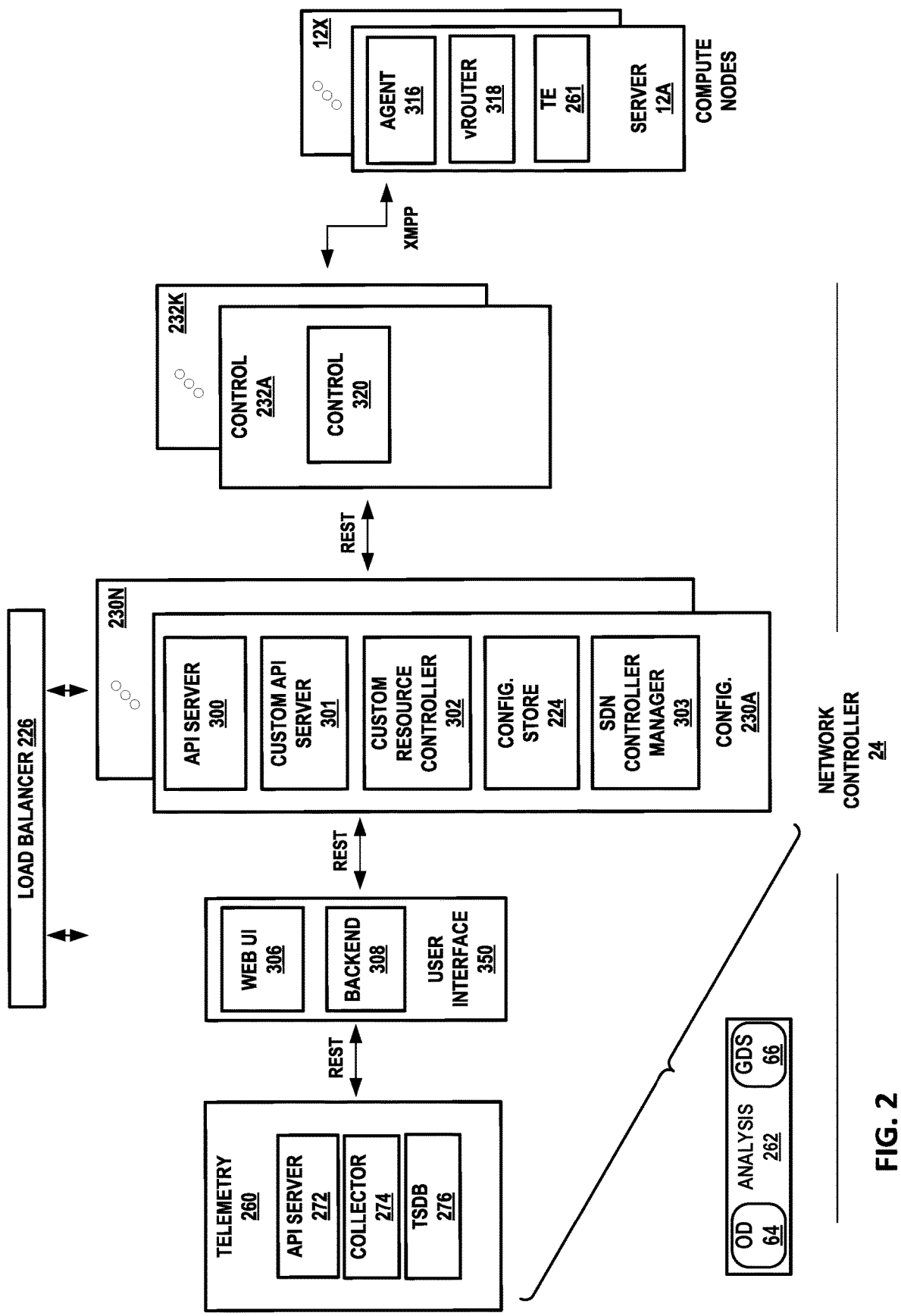
FIG. 2 is a block diagram illustrating another view of components of the SDN architecture and in further detail, in accordance with techniques of this disclosure.

FIG. 2 is a block diagram illustrating another view of components of SDN architecture 200 and in further detail, in accordance with techniques of this disclosure. Configuration nodes 230, control nodes 232, user interface 244, and telemetry node 260 are illustrated with their respective component microservices for implementing network controller 24 and SDN architecture 8 as a cloud native SDN architecture in this example. Each of the component microservices may be deployed to compute nodes.

FIG. 2 illustrates a single cluster divided into network controller 24, user interface 244, compute (servers 12), and telemetry node 260 features. Configuration nodes 230 and control nodes 232 together form network controller 24, although network controller 24 may also include user interface 350 and telemetry node 260 as shown above in the example of FIG. 1.

Figure 3:
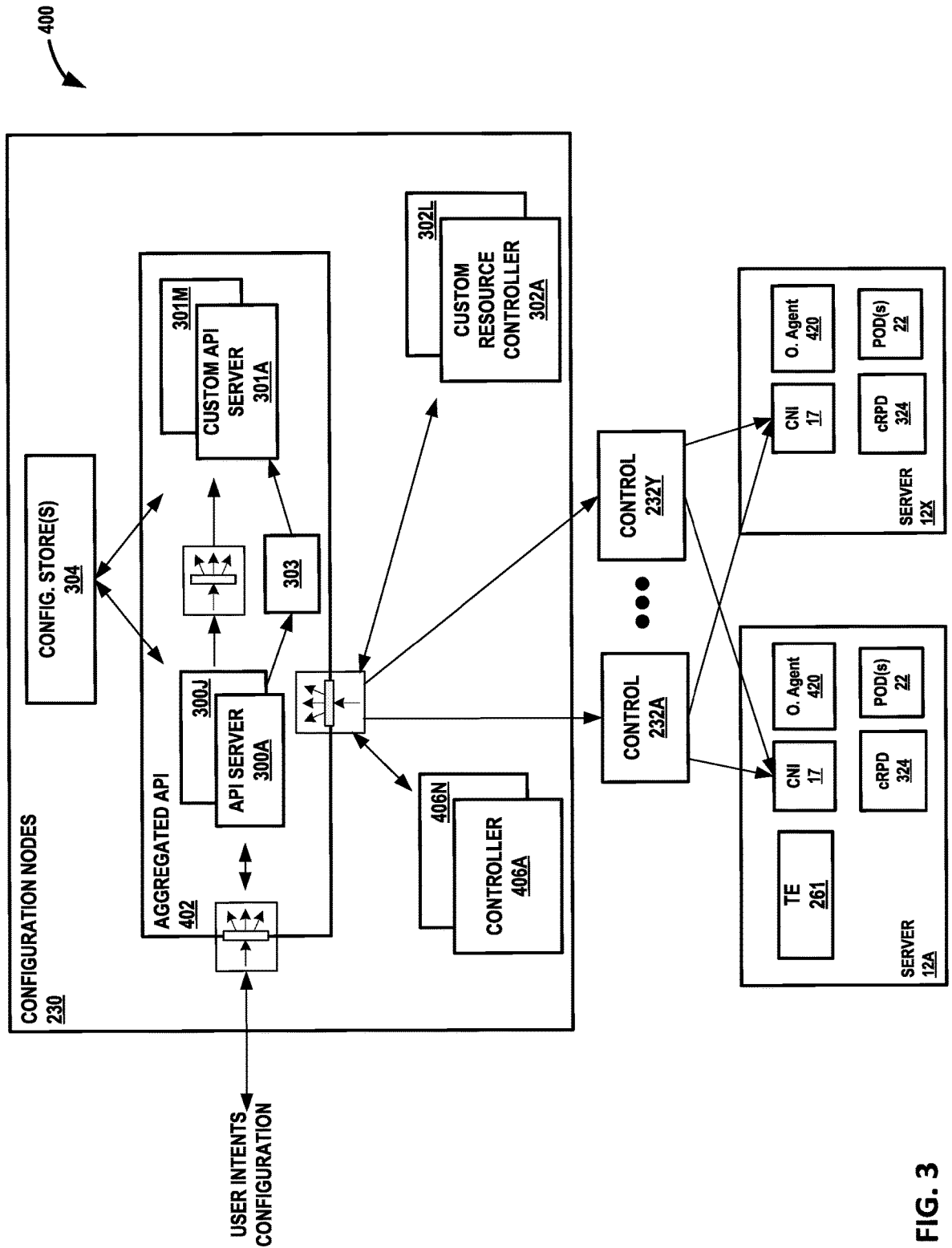
FIG. 3 is a block diagram illustrating example components of an SDN architecture, in accordance with techniques of this disclosure.

Configuration nodes 230 may include component microservices API server 300 (or "Kubernetes API server 300"— corresponding controller 406 not shown in FIG. 3), custom API server 301, custom resource controller 302, and SDN controller manager 303 (sometimes termed "kube-manager" or "SDN kube-manager" where the orchestration platform for network controller 24 is Kubernetes). Contrail-kube-manager is an example of SDN controller manager 303. Configuration nodes 230 extend the API server 300 interface with a custom API server 301 to form an aggregation layer to support a data model for SDN architecture 200. SDN architecture 200 configuration intents may be custom resources.

Control nodes 232 may include component microservices control 320 and coreDNS 322. Control 320 performs configuration distribution and route learning and distribution.

Compute nodes are represented by servers 12. Each compute node includes a virtual router agent 316, virtual router forwarding component (vRouter) 318, and possible a telemetry exporter (TE) 261. One or more or all of virtual router agent 316, vRouter 318, and TE 261 may be component microservices that logically form a virtual router, such as virtual router 21 shown in the example of FIG. 1. In general, virtual router agent 316 performs control related functions. Virtual router agent 316 receives configuration data from control nodes 232 and converts the configuration data to forwarding information for vRouter 318.

Virtual router agent 316 may also performs firewall rule processing, set up flows for vRouter 318, and interface with orchestration plugins (CNI for Kubernetes and Nova plugin for Openstack). Virtual router agent 316 generates routes as workloads (Pods or VMs) are brought up on the compute node, and virtual router 316 exchanges such routes with control nodes 232 for distribution to other compute nodes (control nodes 232 distribute the routes among control nodes 232 using BGP). Virtual router agent 316 also withdraws routes as workloads are terminated. vRouter 318 may support one or more forwarding modes, such as kernel mode, DPDK, SmartNIC offload, and so forth. In some examples of container architectures or virtual machine workloads, compute nodes may be either Kubernetes worker/minion nodes or Openstack nova-compute nodes, depending on the particular orchestrator in use. TE 261 may represent an example of TE 61 shown in the example of FIG. 1, which is configured to interface with server 12A, vRouter 318 and possibly virtual router agent 316 to collect metrics configured by TECD 63 as described above in more detail.

One or more optional telemetry node(s) 260 provide metrics, alarms, logging, and flow analysis. SDN architecture 200 telemetry leverages cloud native monitoring services, such as Prometheus, Elastic, Fluentd, kinaba stack (EFK) (and/or, in some examples, Opensearch and Opensearch-dashboards) and Influx TSDB. The SDN architecture component microservices of configuration nodes 230, control nodes 232, compute nodes, user interface 244, and analytics nodes (not shown) may produce telemetry data. This telemetry data may be consumed by services of telemetry node(s) 260. Telemetry node(s) 260 may expose REST endpoints for users and may support insights and event correlation.

Optional user interface 244 includes web user interface (UI) 306 and UI backend 308 services. In general, user interface 244 provides configuration, monitoring, visualization, security, and troubleshooting for the SDN architecture components.

Each of telemetry 260, user interface 244, configuration nodes 230, control nodes 232, and servers 12/compute nodes may be considered SDN architecture 200 nodes, in that each of these nodes is an entity to implement functionality of the configuration, control, or data planes, or of the UI and telemetry nodes. Node scale is configured during "bring up," and SDN architecture 200 supports automatic scaling of SDN architecture 200 nodes using orchestration system operators, such as Kubernetes operators.

In the example of FIG. 2, telemetry node 260 includes an API server 272, a collector 274, and a time-series database (TSDB) 276. Via a user interface, such as web user interface 306, API server 262 may receive requests to enable and/or disable one or more of metric groups. Metric groups may be defined using yet another markup language (YAML), and as noted above may be pre-configured. Metric groups identify which metrics should be obtained for reviewing operations and maintenance of SDN architecture 8.

For each of the metric groups, there is a header that defines an apiVersion, a kind indicating that this YAML definition is for a Metric Group, metadata for a name, such as controller-peer, a specification ("spec") indicating that export is true, the metric type indicating the type of metrics collected (which is for the network controller in the example YAML definition listed directly above) and a list of individual metrics to be exported. API server 272 may then receive a request to enable exportation for one or more metric groups, which the network administrator may select via web UI 306, resulting in the request to enable one or more of metric groups being sent to telemetry node 260 via API server 272. As noted above, SDN architecture configuration intents may be custom resources, including telemetry configuration requests to enable and/or disable metric groups.

This request may configure telemetry node 260 to enable and/or disable one or more metric groups by setting the export spec to "true." By default all of metric groups may initially be enabled. Moreover, although not explicitly shown in the above examples of metric groups defined using YAML, individual metrics may include a metric specific export that allows for enabling export for only individual metrics in a given one of metric groups. Once export is enabled for one or more metric groups, API server 272 may interface with collector 274 to generate TECD. TECD may represent a config map that contains a flat list of metrics.

Collector 274 may, when generating TECD, remove any redundant (or in other words duplicate) metrics that may exist in two or more of enabled metric groups, which results in TECD only defining a single metric for collection and exportation rather than configuring TE 261 to collect and export two or more instances of the same metric.

Collector 274 may determine where to send TECD based on the cluster name as noted above, selecting the TE associated with the cluster, which in this case is assumed to be TE 261. Collector 274 may interface with TE 261, providing TECD to TE 261. TE 261 may receive TECD and configure various exporter agents (not shown in the example of FIG. 2) to collect the subset of metrics defined by enabled ones of metric groups. These agents may collect the identified subset of metrics on a periodic basis (e.g., every 30 seconds), reporting these metrics back to TE 261. TE 261 may, responsive to receiving the subset of metrics, export the subset of metrics back as key value pairs, with the key identifying the metric and the value containing metric data.

Collector 274 may receive metric data and store metric data to TSDB 276. TSDB 276 may represent, as one example, a Prometheus server that facilitates efficient storage of time series data. Collector 274 may continue collecting metrics data in this periodic fashion. As noted above, metrics data may quickly grow should all metric groups be enabled, which may put significant strain on the network and underlying physical resources. Allowing for only enabling export of select metric groups may reduce this strain on the network, particularly when only one or two metric groups may be required for any given use case.

While telemetry node 260 is shown as a node separate from configuration nodes 230, telemetry node 260 may be implemented as a separate operator using various custom resources, including metric group custom resources. Telemetry node 260 may act as a client of the container orchestration platform (e.g., the Kubernetes API) that acts as a controller, such as one of custom resource controllers 302 of configuration nodes 230, for one or more custom resources (which again may include the metric group custom resource described throughout this disclosure). In this sense, API server 272 of telemetry node 260 may extend custom API server 301 (or form a part of custom API server 301). As a custom controller, telemetry node 260 may perform the reconciliation shown in the example of FIG. 6, including a reconciler similar to reconciler 816 for adjusting a current state to a desired state, which in the context of metric groups involves configuring TE 261 to collect and export metric data according to metric groups. In this respect, telemetry 260 may collect metrics data that may form part of OD 64.

As further shown in the example of FIG. 2, network controller 24 may include analysis system 262, which may represent an example analysis system 62. Analysis system 262 may interface with telemetry 260 to obtain the metrics data from TSDB 276, where such metrics data may again form a portion of OD 64. Analysis system 262 may also interface with configuration nodes 230 via API server 300 and/or custom API server 301 to obtain configuration data that is stored to configuration store 224, where such configuration data may include schema objects that define various dependencies between standard resources, custom resources, other schema objects, etc. Such configuration data may also form a portion of OD 64. Analysis system 262 may also interface with control nodes 232 and/or server (or in other words, compute) nodes 12 to obtain control data that may further form a portion of OD 64.

Analysis system 262 may process OD 64 in the manner described below in more detail to form GDS 66, which is traversed to identify potential issues occurring within SDN architecture 8. Analysis system 262 may interface with user interface 350 to output the potential issues occurring within SDN architecture 8.

FIG. 3 is a block diagram illustrating example components of an SDN architecture, in accordance with techniques of this disclosure. In this example, SDN architecture 400 extends and uses Kubernetes API server for network configuration objects that realize user intents for the network configuration. Such configuration objects, in Kubernetes terminology, are referred to as custom resources and when persisted in SDN architecture are referred to simply as objects. Configuration objects are mainly user intents (e.g., Virtual Networks, BGPaaS, Network Policy, Service Chaining, etc.).

SDN architecture 400 configuration nodes 230 may uses Kubernetes API server for configuration objects. In kubernetes terminology, these are called custom resources.

Kubernetes provides two ways to add custom resources to a cluster:
Custom Resource Definitions (CRDs) are simple and can be created without any programming.
API Aggregation requires programming but allows more control over API behaviors, such as how data is stored and conversion between API versions.

Aggregated APIs are subordinate API servers that sit behind the primary API server, which acts as a proxy. This arrangement is called API Aggregation (AA). To users, it simply appears that the Kubernetes API is extended. CRDs allow users to create new types of resources without adding another API server, such as adding MGs 62. Regardless of how they are installed, the new resources are referred to as Custom Resources (CR) to distinguish them from native Kubernetes resources (e.g., Pods). CRDs were used in the initial Config prototypes. The architecture may use the API Server Builder Alpha library to implement an aggregated API. API Server Builder is a collection of libraries and tools to build native Kubernetes aggregation extensions.

Usually, each resource in the Kubernetes API requires code that handles REST requests and manages persistent storage of objects. The main Kubernetes API server 300 (implemented with API server microservices 300A-300J) handles native resources and can also generically handle custom resources through CRDs. Aggregated API 402 represents an aggregation layer that extends the Kubernetes API server 300 to allow for provide specialized implementations for custom resources by writing and deploying custom API server 301 (using custom API server microservices 301A-301M). The main API server 300 delegates requests for the custom resources to custom API server 301, thereby making such resources available to all of its clients.

In this way, API server 300 (e.g., kube-apiserver) receives the Kubernetes configuration objects, native objects (pods, services) and custom resources. Custom resources for SDN architecture 400 may include configuration objects that, when an intended state of the configuration object in SDN architecture 400 is realized, implements an intended network configuration of SDN architecture 400, including implementation of each of VNRs 52 as one or more import policies and/or one or more export policies along with the common route target (and routing instance). Realizing MGs 62 within SDN architecture 400 may, as described above, result in enabling and disabling collection and exportation of individual metrics by TE 261.

In this respect, custom resources may correspond to configuration schemas traditionally defined for network configuration but that, according to techniques of this disclosure, are extended to be manipulable through aggregated API 402. Such custom resources may be alternately termed and referred to herein as "custom resources for SDN architecture configuration." These may include VNs, bgp-as-a-service (BGPaaS), subnet, virtual router, service instance, project, physical interface, logical interface, node, network ipam, floating ip, alarm, alias ip, access control list, firewall policy, firewall rule, network policy, route target, routing instance. Custom resources for SDN architecture configuration may correspond to configuration objects conventionally exposed by an SDN controller, but in accordance with techniques described herein, the configuration objects are exposed as custom resources and consolidated along with Kubernetes native/built-in resources to support a unified intent model, exposed by aggregated API 402, that is realized by Kubernetes controllers 406A-406N and by custom resource controller 302 (shown in FIG. 3 with component microservices 302A-302L) that works to reconcile the actual state of the computing infrastructure including network elements with the intended state.

Given the unified nature in terms of exposing custom resources consolidated along with Kubernetes native/built-in resources, a Kubernetes administrator (or other Kubernetes user) may define MGs 62, using common Kubernetes semantics that may then be translated into complex policies detailing the import and export of MD 64 without requiring much if any understanding of how telemetry node 260 and telemetry exporter 261 operate to collect and export MD 64. As such, various aspects of the techniques may promote a more unified user experience that potentially results in less misconfiguration and trial-and-error, which may improve the execution of SDN architecture 400 itself (in terms of utilizing less processing cycles, memory, bandwidth, etc., and associated power).

API server 300 aggregation layer sends API custom resources to their corresponding, registered custom API server 300. There may be multiple custom API servers/custom resource controllers to support different kinds of custom resources. Custom API server 300 handles custom resources for SDN architecture configuration and writes to configuration store(s) 304, which may be etcd. Custom API server 300 may be host and expose an SDN controller identifier allocation service that may be required by custom resource controller 302.

Figure 6:
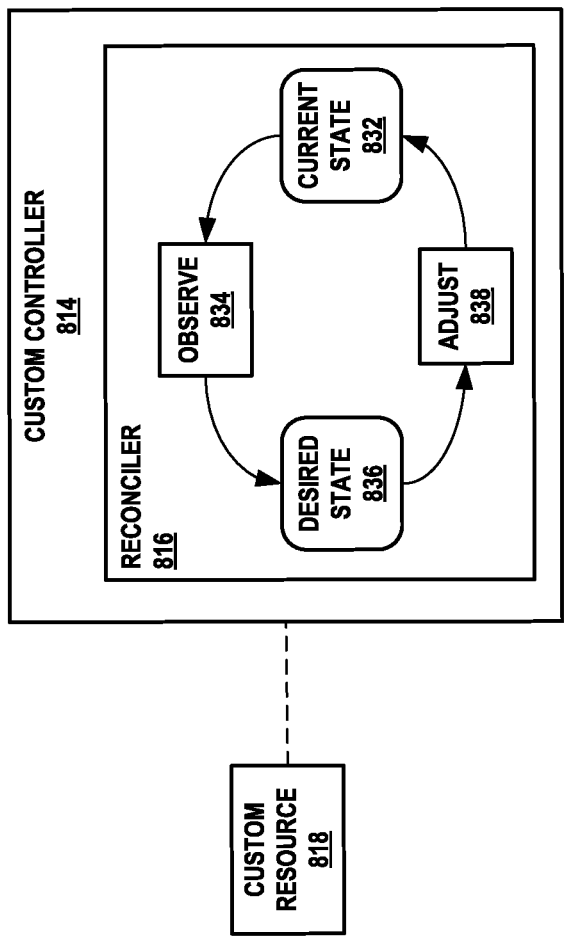
FIG. 6 is a block diagram illustrating an example of a custom controller for custom resource(s) for SDN architecture configuration, according to techniques of this disclosure.

Custom resource controller(s) 302 start to apply business logic to reach the user's intention provided with user intents configuration. The business logic is implemented as a reconciliation loop. FIG. 6 is a block diagram illustrating an example of a custom controller for custom resource(s) for a SDN architecture configuration, according to techniques of this disclosure. Customer controller 814 may represent an example instance of custom resource controller 301. In the example illustrated in FIG. 6, custom controller 814 can be associated with custom resource 818. Custom resource 818 can be any custom resource for SDN architecture configuration. Custom controller 814 can include reconciler 816 that includes logic to execute a reconciliation loop in which custom controller 814 observes 834 (e.g., monitors) a current state 832 of custom resource 818. In response to determining that a desired state 836 does not match a current state 832, reconciler 816 can perform actions to adjust 838 the state of the custom resource such that the current state 832 matches the desired state 836. A request may be received by API server 300 and relayed to custom API server 301 to change the current state 832 of custom resource 818 to desired state 836.

In the case that API request 301 is a create request for a custom resource, reconciler 816 can act on the create event for the instance data for the custom resource. Reconciler 816 may create instance data for custom resources that the requested custom resource depends on. As an example, an edge node custom resource may depend on a virtual network custom resource, a virtual interface custom resource, and an IP address custom resource. In this example, when reconciler 816 receives a create event on an edge node custom resource, reconciler 816 can also create the custom resources that the edge node custom resource depends upon, e.g., a virtual network custom resource, a virtual interface custom resource, and an IP address custom resource.

By default, custom resource controllers 302 are running an active-passive mode and consistency is achieved using master election. When a controller pod starts it tries to create a ConfigMap resource in Kubernetes using a specified key. If creation succeeds, that pod becomes master and starts processing reconciliation requests; otherwise it blocks trying to create ConfigMap in an endless loop.

The configuration plane as implemented by configuration nodes 230 have high availability. Configuration nodes 230 may be based on Kubernetes, including the kube-apiserver service (e.g., API server 300) and the storage backend etcd (e.g., configuration store(s) 304). Effectively, aggregated API 402 implemented by configuration nodes 230 operates as the front end for the control plane implemented by control nodes 232. The main implementation of API server 300 is kube-apiserver, which is designed to scale horizontally by deploying more instances. As shown, several instances of API server 300 can be run to load balance API requests and processing.

Configuration store(s) 304 may be implemented as etcd. Etcd is a consistent and highly-available key value store used as the Kubernetes backing store for cluster data.

Figure 4:
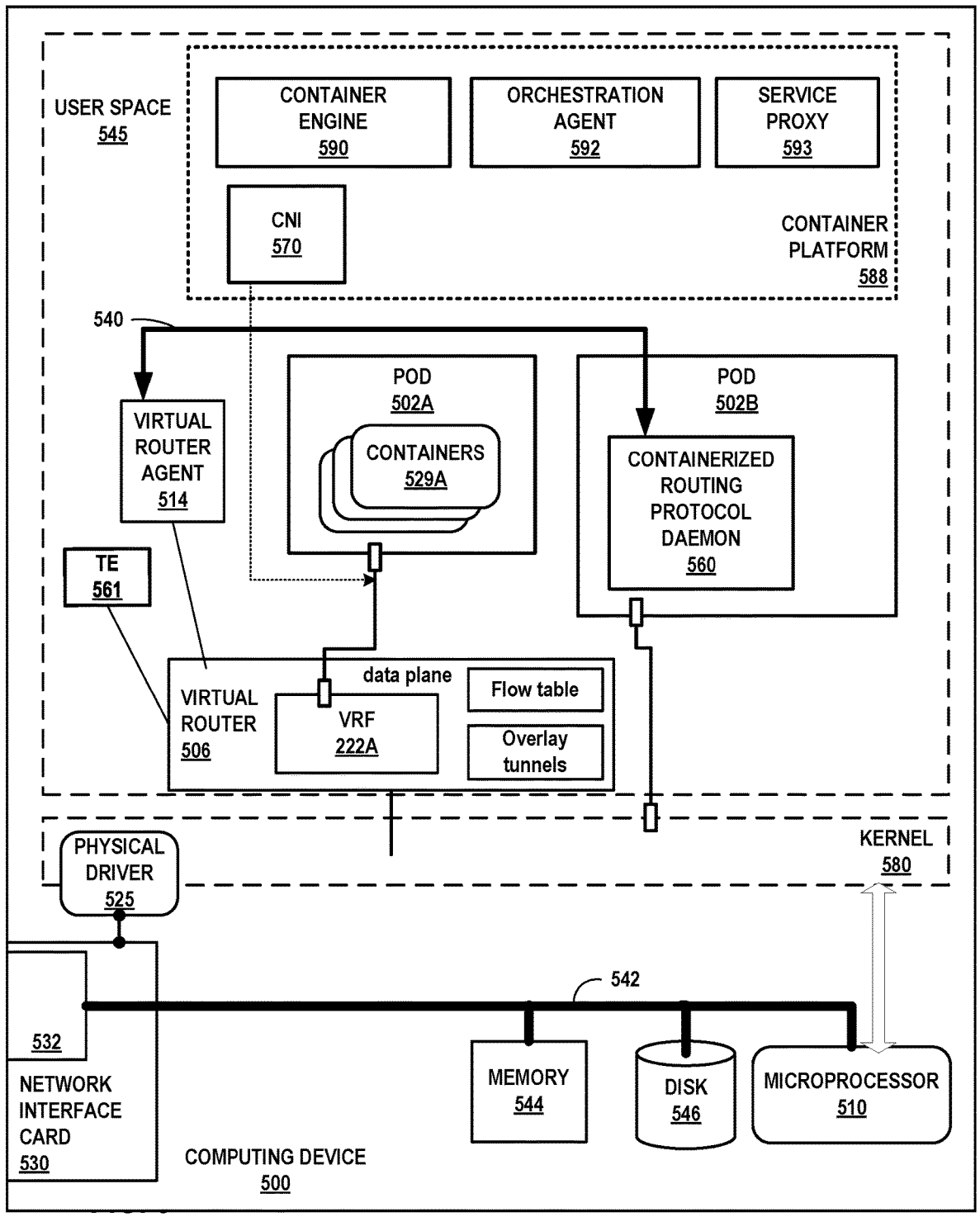
FIG. 4 is a block diagram illustrating example components of an SDN architecture, in accordance with techniques of this disclosure.

In the example of FIG. 4, servers 12 of SDN architecture 400 each include an orchestration agent 420 and a containerized (or "cloud native") routing protocol daemon 324. These components of SDN architecture 400 are described in further detail below.

SDN controller manager 303 may operate as an interface between Kubernetes core resources (Service, Namespace, Pod, Network Policy, Network Attachment Definition) and the extended SDN architecture resources (VirtualNetwork, RoutingInstance etc.). SDN controller manager 303 watches the Kubernetes API for changes on both Kubernetes core and the custom resources for SDN architecture configuration and, as a result, can perform CRUD operations on the relevant resources.

In some examples, SDN controller manager 303 is a collection of one or more Kubernetes custom controllers. In some examples, in single or multi-cluster deployments, SDN controller manager 303 may run on the Kubernetes cluster(s) it manages SDN controller manager 303 listens to the following Kubernetes objects for Create, Delete, and Update events:
Pod
Service
NodePort
Ingress
Endpoint
Namespace
Deployment
Network Policy When these events are generated, SDN controller manager 303 creates appropriate SDN architecture objects, which are in turn defined as custom resources for SDN architecture configuration. In response to detecting an event on an instance of a custom resource, whether instantiated by SDN controller manager 303 and/or through custom API server 301, control node 232 obtains configuration data for the instance for the custom resource and configures a corresponding instance of a configuration object in SDN architecture 400.

For example, SDN controller manager 303 watches for the Pod creation event and, in response, may create the following SDN architecture objects: VirtualMachine (a workload/pod), VirtualMachineInterface (a virtual network interface), and an InstanceIP (IP address). Control nodes 232 may then instantiate the SDN architecture objects, in this case, in a selected compute node.

As an example, based on a watch, control node 232A may detect an event on an instance of first custom resource exposed by customer API server 301A, where the first custom resource is for configuring some aspect of SDN architecture system 400 and corresponds to a type of configuration object of SDN architecture system 400. For instance, the type of configuration object may be a firewall rule corresponding to the first custom resource. In response to the event, control node 232A may obtain configuration data for the firewall rule instance (e.g., the firewall rule specification) and provision the firewall rule in a virtual router for server 12A. Configuration nodes 230 and control nodes 232 may perform similar operations for other custom resource with corresponding types of configuration objects for the SDN architecture, such as virtual network, virtual network routers. bgp-as-a-service (BGPaaS), subnet, virtual router, service instance, project, physical interface, logical interface, node, network ipam, floating ip, alarm, alias ip, access control list, firewall policy, firewall rile, network policy, route target, routing instance, etc.

FIG. 4 is a block diagram of an example computing device, according to techniques described in this disclosure. Computing device 500 of FIG. 4 may represent a real or virtual server and may represent an example instance of any of servers 12 and may be referred to as a compute node, master/minion node, or host. Computing device 500 includes in this example, a bus 542 coupling hardware components of a computing device 500 hardware environment. Bus 542 couples network interface card (NIC) 530, storage disk 546, and one or more microprocessors 210 (hereinafter, "microprocessor 510"). NIC 530 may be SR- IOV-capable. A front-side bus may in some cases couple microprocessor 510 and memory device 524. In some examples, bus 542 may couple memory device 524, microprocessor 510, and NIC 530. Bus 542 may represent a Peripheral Component Interface (PCI) express (PCIe) bus. In some examples, a direct memory access (DMA) controller may control DMA transfers among components coupled to bus 542. In some examples, components coupled to bus 542 control DMA transfers among components coupled to bus 542.

Microprocessor 510 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 546 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 510.

Main memory 524 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 524 provides a physical address space composed of addressable memory locations.

Network interface card (NIC) 530 includes one or more interfaces 532 configured to exchange packets using links of an underlying physical network. Interfaces 532 may include a port interface card having one or more network ports. NIC 530 may also include an on-card memory to, e.g., store packet data. Direct memory access transfers between the NIC 530 and other devices coupled to bus 542 may read/write from/to the NIC memory.

Memory 524, NIC 530, storage disk 546, and microprocessor 510 may provide an operating environment for a software stack that includes an operating system kernel 580 executing in kernel space. Kernel 580 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 580 provides an execution environment for one or more processes in user space 545.

Kernel 580 includes a physical driver 525 to use the network interface card 530. Network interface card 530 may also implement SR-IOV to enable sharing the physical network function (I/O) among one or more virtual execution elements, such as containers 529A or one or more virtual machines (not shown in FIG. 4). Shared virtual devices such as virtual functions may provide dedicated resources such that each of the virtual execution elements may access dedicated resources of NIC 530, which therefore appears to each of the virtual execution elements as a dedicated NIC. Virtual functions may represent lightweight PCIe functions that share physical resources with a physical function used by physical driver 525 and with other virtual functions. For an SR-IOV-capable NIC 530, NIC 530 may have thousands of available virtual functions according to the SR-IOV standard, but for I/O-intensive applications the number of configured virtual functions is typically much smaller.

Computing device 500 may be coupled to a physical network switch fabric that includes an overlay network that extends switch fabric from physical switches to software or "virtual" routers of physical servers coupled to the switch fabric, including virtual router 506. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing.

Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 500 of FIG. 4, virtual router 506 executes within user space as a DPDK-based virtual router, but virtual router 506 may execute within a hypervisor, a host operating system, a host application, or a virtual machine in various implementations.

Virtual router 506 may replace and subsume the virtual routing/bridging functionality of the Linux bridge/OVS module that is commonly used for Kubernetes deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 can be executing as a kernel module or as a user space DPDK process (virtual router 506 is shown here in user space 545). Virtual router agent 514 may also be executing in user space. In the example computing device 500, virtual router 506 executes within user space as a DPDK-based virtual router, but virtual router 506 may execute within a hypervisor, a host operating system, a host application, or a virtual machine in various implementations. Virtual router agent 514 has a connection to network controller 24 using a channel, which is used to download configurations and forwarding information. Virtual router agent 514 programs this forwarding state to the virtual router data (or "forwarding") plane represented by virtual router 506. Virtual router 506 and virtual router agent 514 may be processes. Virtual router 506 and virtual router agent 514 containerized/cloud native.

Virtual router 506 may replace and subsume the virtual routing/bridging functionality of the Linux bridge/OVS module that is commonly used for Kubernetes deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 may be multi-threaded and execute on one or more processor cores. Virtual router 506 may include multiple queues. Virtual router 506 may implement a packet processing pipeline. The pipeline can be stitched by the virtual router agent 514 from the simplest to the most complicated manner depending on the operations to be applied to a packet. Virtual router 506 may maintain multiple instances of forwarding bases. Virtual router 506 may access and update tables using RCU (Read Copy Update) locks.

To send packets to other compute nodes or switches, virtual router 506 uses one or more physical interfaces 532. In general, virtual router 506 exchanges overlay packets with workloads, such as VMs or pods 502. Virtual router 506 has multiple virtual network interfaces (e.g., vifs). These interfaces may include the kernel interface, vhost0, for exchanging packets with the host operating system; an interface with virtual router agent 514, pkt0, to obtain forwarding state from the network controller and to send up exception packets. There may be one or more virtual network interfaces corresponding to the one or more physical network interfaces 532. Other virtual network interfaces of virtual router 506 are for exchanging packets with the workloads.

In a kernel-based deployment of virtual router 506 (not shown), virtual router 506 is installed as a kernel module inside the operating system. Virtual router 506 registers itself with the TCP/IP stack to receive packets from any of the desired operating system interfaces that it wants to. The interfaces can be bond, physical, tap (for VMs), veth (for containers) etc. Virtual router 506 in this mode relies on the operating system to send and receive packets from different interfaces. For example, the operating system may expose a tap interface backed by a vhost-net driver to communicate with VMs. Once virtual router 506 registers for packets from this tap interface, the TCP/IP stack sends all the packets to it. Virtual router 506 sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 506 (shown in FIG. 5), virtual router 506 is installed as a user space 545 application that is linked to the DPDK library. This may lead to faster performance than a kernel-based deployment, particularly in the presence of high packet rates. The physical interfaces 532 are used by the poll mode drivers (PMDs) of DPDK rather the kernel's interrupt-based drivers. The registers of physical interfaces 532 may be exposed into user space 545 in order to be accessible to the PMDs; a physical interface 532 bound in this way is no longer managed by or visible to the host operating system, and the DPDK-based virtual router 506 manages the physical interface 532. This includes packet polling, packet processing, and packet forwarding. In other words, user packet processing steps are performed by the virtual router 506 DPDK data plane. The nature of this "polling mode" makes the virtual router 506 DPDK data plane packet processing/forwarding much more efficient as compared to the interrupt mode when the packet rate is high. There are comparatively few interrupts and context switching during packet I/O, compared to kernel-mode virtual router 506, and interrupt and context switching during packet I/O may in some cases be avoided altogether.

In general, each of pods 502A-502B may be assigned one or more virtual network addresses for use within respective virtual networks, where each of the virtual networks may be associated with a different virtual subnet provided by virtual router 506. Pod 502B may be assigned its own virtual layer three (L3) IP address, for example, for sending and receiving communications but may be unaware of an IP address of the computing device 500 on which the pod 502B executes. The virtual network address may thus differ from the logical address for the underlying, physical computer system, e.g., computing device 500.

Computing device 500 includes a virtual router agent 514 that controls the overlay of virtual networks for computing device 500 and that coordinates the routing of data packets within computing device 500. In general, virtual router agent 514 communicates with network controller 24 for the virtualization infrastructure, which generates commands to create virtual networks and configure network virtualization endpoints, such as computing device 500 and, more specifically, virtual router 506, as a well as virtual network interface 212. By configuring virtual router 506 based on information received from network controller 24, virtual router agent 514 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 529A-529B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 506. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 506 performs tunnel encapsulation/decapsulation for packets sourced by/destined to any containers of pods 502, and virtual router 506 exchanges packets with pods 502 via bus 542 and/or a bridge of NIC 530.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 506 implements one or more virtual routing and forwarding instances (VRFs), such as VRF 222A, for respective virtual networks for which virtual router 506 operates as respective tunnel endpoints. In general, each of the VRFs stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of the VRFs may include a network forwarding table storing routing and forwarding information for the virtual network.

NIC 530 may receive tunnel packets. Virtual router 506 processes the tunnel packet to determine, from the tunnel encapsulation header, the virtual network of the source and destination endpoints for the inner packet. Virtual router 506 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212. VRF 222A forwards the inner packet via virtual network interface 212 to pod 502A in response.

Containers 529A may also source inner packets as source virtual network endpoints. Container 529A, for instance, may generate a layer 3 inner packet destined for a destination virtual network endpoint that is executed by another computing device (i.e., not computing device 500) or for another one of containers. Container 529A may sends the layer 3 inner packet to virtual router 506 via the virtual network interface attached to VRF 222A.

Virtual router 506 receives the inner packet and layer 2 header and determines a virtual network for the inner packet. Virtual router 506 may determine the virtual network using any of the above-described virtual network interface implementation techniques (e.g., macvlan, veth, etc.). Virtual router 506 uses the VRF 222A corresponding to the virtual network for the inner packet to generate an outer header for the inner packet, the outer header including an outer IP header for the overlay tunnel and a tunnel encapsulation header identifying the virtual network. Virtual router 506 encapsulates the inner packet with the outer header. Virtual router 506 may encapsulate the tunnel packet with a new layer 2 header having a destination layer 2 address associated with a device external to the computing device 500, e.g., a TOR switch 16 or one of servers 12. If external to computing device 500, virtual router 506 outputs the tunnel packet with the new layer 2 header to NIC 530 using physical function 221. NIC 530 outputs the packet on an outbound interface. If the destination is another virtual network endpoint executing on computing device 500, virtual router 506 routes the packet to the appropriate one of virtual network interfaces 212, 213.

In some examples, a controller for computing device 500 (e.g., network controller 24 of FIG. 1) configures a default route in each of pods 502 to cause the virtual machines 224 to use virtual router 506 as an initial next hop for outbound packets. In some examples, NIC 530 is configured with one or more forwarding rules to cause all packets received from virtual machines 224 to be switched to virtual router 506.

Pod 502A includes one or more application containers 529A. Pod 502B includes an instance of containerized routing protocol daemon (cRPD) 560. Container platform 588 includes container runtime 590, orchestration agent 592, service proxy 593, and CNI 570.

Container engine 590 includes code executable by microprocessor 510. Container runtime 590 may be one or more computer processes. Container engine 590 runs containerized applications in the form of containers 529A-529B. Container engine 590 may represent a Dockert, rkt, or other container engine for managing containers. In general, container engine 590 receives requests and manages objects such as images, containers, networks, and volumes. An image is a template with instructions for creating a container. A container is an executable instance of an image. Based on directives from controller agent 592, container engine 590 may obtain images and instantiate them as executable containers in pods 502A-502B.

Service proxy 593 includes code executable by microprocessor 510. Service proxy 593 may be one or more computer processes. Service proxy 593 monitors for the addition and removal of service and endpoints objects, and it maintains the network configuration of the computing device 500 to ensure communication among pods and containers, e.g., using services. Service proxy 593 may also manage iptables to capture traffic to a service's virtual IP address and port and redirect the traffic to the proxy port that proxies a backed pod. Service proxy 593 may represent a kube-proxy for a minion node of a Kubernetes cluster. In some examples, container platform 588 does not include a service proxy 593 or the service proxy 593 is disabled in favor of configuration of virtual router 506 and pods 502 by CNI 570.

Orchestration agent 592 includes code executable by microprocessor 510. Orchestration agent 592 may be one or more computer processes. Orchestration agent 592 may represent a kubelet for a minion node of a Kubernetes cluster. Orchestration agent 592 is an agent of an orchestrator, e.g., orchestrator 23 of FIG. 1, that receives container specification data for containers and ensures the containers execute by computing device 500. Container specification data may be in the form of a manifest file sent to orchestration agent 592 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 502 of containers. Based on the container specification data, orchestration agent 592 directs container engine 590 to obtain and instantiate the container images for containers 529, for execution of containers 529 by computing device 500.

Orchestration agent 592 instantiates or otherwise invokes CNI 570 to configure one or more virtual network interfaces for each of pods 502. For example, orchestration agent 592 receives a container specification data for pod 502A and directs container engine 590 to create the pod 502A with containers 529A based on the container specification data for pod 502A. Orchestration agent 592 also invokes the CNI 570 to configure, for pod 502A, virtual network interface for a virtual network corresponding to VRFs 222A. In this example, pod 502A is a virtual network endpoint for a virtual network corresponding to VRF 222A.

CNI 570 may obtain interface configuration data for configuring virtual network interfaces for pods 502. Virtual router agent 514 operates as a virtual network control plane module for enabling network controller 24 to configure virtual router 506. Unlike the orchestration control plane (including the container platforms 588 for minion nodes and the master node(s), e.g., orchestrator 23), which manages the provisioning, scheduling, and managing virtual execution elements, a virtual network control plane (including network controller 24 and virtual router agent 514 for minion nodes) manages the configuration of virtual networks implemented in the data plane in part by virtual routers 506 of the minion nodes. Virtual router agent 514 communicates, to CNI 570, interface configuration data for virtual network interfaces to enable an orchestration control plane element (i.e., CNI 570) to configure the virtual network interfaces according to the configuration state determined by the network controller 24, thus bridging the gap between the orchestration control plane and virtual network control plane. In addition, this may enable a CNI 570 to obtain interface configuration data for multiple virtual network interfaces for a pod and configure the multiple virtual network interfaces, which may reduce communication and resource overhead inherent with invoking a separate CNI 570 for configuring each virtual network interface.

Containerized routing protocol daemons are described in U.S. application Ser. No. 17/649,632, filed Feb. 1, 2022, which is incorporated by reference herein in its entirety.

As further shown in the example of FIG. 4, TE 561 may represent one example of TE 61 and/or 261. While not specifically shown in the example of FIG. 4, virtual router 506, virtual router agent 514, and TE 561 may execute in a separate pod similar to pods 502A and 502B, where such pod may generally represent an abstraction of virtual router 506, executing a number of different containers (one for each of virtual router 506, virtual router agent 514, and TE 561). TE 561 may receive TECD in order to configure collection by individual agents of MD 64. As noted above, TECD may represent a flat-list of metrics to enable for collection that has been converted from requests to enable individual metric groups. These agents may inspect virtual router 506 and underlying physical resources to periodically (although such collection may not be periodic) metrics data, which is then exported back to telemetry node 60/260.

FIG. 5A is a block diagram illustrating control/routing planes for underlay network and overlay network configuration using an SDN architecture, according to techniques of this disclosure. FIG. 5B is a block diagram illustrating a configured virtual network to connect pods using a tunnel configured in the underlay network, according to techniques of this disclosure.

Network controller 24 for the SDN architecture may use distributed or centralized routing plane architectures. The SDN architecture may use a containerized routing protocol daemon (process).

From the perspective of network signaling, the routing plane can work according to a distributed model, where a cRPD runs on every compute node in the cluster. This essentially means that the intelligence is built into the compute nodes and involves complex configurations at each node. The route reflector (RR) in this model may not make intelligent routing decisions but is used as a relay to reflect routes between the nodes. A distributed container routing protocol daemon (cRPD) is a routing protocol process that may be used wherein each compute node runs its own instance of the routing daemon. At the same time, a centralized cRPD master instance may act as an RR to relay routing information between the compute nodes. The routing and configuration intelligence is distributed across the nodes with an RR at the central location.

The routing plane can alternatively work according to a more centralized model, in which components of network controller runs centrally and absorbs the intelligence needed to process configuration information, construct the network topology, and program the forwarding plane into the virtual routers. The virtual router agent is a local agent to process information being programmed by the network controller. This design leads to facilitates more limited intelligence required at the compute nodes and tends to lead to simpler configuration states.

The centralized control plane provides for the following:
  Allows for the agent routing framework to be simpler and lighter. The complexity and limitations of BGP are hidden from the agent. There is no need for the agent to understand concepts like route-distinguishers, route-targets, etc. The agents just exchange prefixes and build its forwarding information accordingly
  Control nodes can do more than routing. They build on the virtual network concept and can generate new routes using route replication and re-origination (for instance to support features like service chaining and inter-VN routing, among other use cases).
  Building the BUM tree for optimal broadcast and multicast forwarding.

Note that the control plane has a distributed nature for certain aspects. As a control plane supporting distributed functionality, it allows each local virtual router agent to publish its local routes and subscribe for configuration on a need-to-know basis.

It makes sense then to think of the control plane design from a tooling POV and use tools at hand appropriately where they fit best, Consider the set of pros and cons of contrail-bgp and cRPD.

The following functionalities may be provided by cRPDs or control nodes of network controller 24.

Routing Daemon/Process

Both control nodes and cRPDs can act as routing daemons implementing different protocols and having the capability to program routing information in the forwarding plane.

cRPD implements routing protocols with a rich routing stack that includes interior gateway protocols (IGPs) (e.g., intermediate system to intermediate system (IS-IS)), BGP-LU, BGP-CT, SR-MPLS/SRv6, bidirectional forwarding detection (BIND), path computation element protocol (PCEP), etc. It can also be deployed to provide control plane only services such as a route-reflector and is popular in internet routing use-cases due to these capabilities.

Control nodes 232 also implement routing protocols but are predominantly BGP-based. Control nodes 232 understands overlay networking. Control nodes 232 provide a rich feature set in overlay virtualization and cater to SDN use cases. Overlay features such as virtualization (using the abstraction of a virtual network) and service chaining are very popular among telco and cloud providers. cRPD may not in some cases include support for such overlay functionality. However, the rich feature set of CRPD provides strong support for the underlay network.

Network Orchestration/Automation

Routing functionality is just one part of the control nodes 232. An integral part of overlay networking is orchestration. Apart from providing overlay routing, control nodes 232 help in modeling the orchestration functionality and provide network automation. Central to orchestration capabilities of control nodes 232 is an ability to use the virtual network (and related objects)-based abstraction, including the above noted VNRs, to model network virtualization. Control nodes 232 interface with the configuration nodes 230 to relay configuration information to both the control plane and the data plane. Control nodes 232 also assist in building overlay trees for multicast layer 2 and layer 3. For example, a control node may build a virtual topology of the cluster it serves to achieve this. cRPD does not typically include such orchestration capabilities.

High Availability and Horizontal Scalability

Control node design is more centralized while cRPD is more distributed. There is a cRPD worker node running on each compute node. Control nodes 232 on the other hand do not run on the compute and can even run on a remote cluster (i.e., separate and in some cases geographically remote from the workload cluster). Control nodes 232 also provide horizontal scalability for HA and run in active-active mode. The compute load is shared among control nodes 232. cRPD on the other hand does not typically provide horizontal scalability. Both control nodes 232 and cRPD may provide HA with graceful restart and may allow for data plane operation in headless mode—wherein the virtual router can run even if the control plane restarts.

The control plane should be more than just a routing daemon. It should support overlay routing and network orchestration/automation, while cRPD does well as a routing protocol in managing underlay routing. cRPD, however, typically lacks network orchestration capabilities and does not provide strong support for overlay routing.

Accordingly, in some examples, the SDN architecture may have cRPD on the compute nodes as shown in FIGS. 5A-5B. FIG. 5A illustrates SDN architecture 700, which may represent an example implementation SDN architecture 8 or 400. In SDN architecture 700, cRPD 324 runs on the compute nodes and provide underlay routing to the forwarding plane while running a centralized (and horizontally scalable) set of control nodes 232 providing orchestration and overlay services. In some examples, instead of running cRPD 324 on the compute nodes, a default gateway may be used.

cRPD 324 on the compute nodes provides rich underlay routing to the forwarding plane by interacting with virtual router agent 514 using interface 540, which may be a gRPC interface. The virtual router agent interface may permit programming routes, configuring virtual network interfaces for the overlay, and otherwise configuring virtual router 506. This is described in further detail in U.S. application Ser. No. 17/649,632. At the same time, one or more control nodes 232 run as separate pods providing overlay services. SDN architecture 700 may thus obtain both a rich overlay and orchestration provided by control nodes 232 and modern underlay routing by cRPD 324 on the compute nodes to complement control nodes 232. A separate cRPD controller 720 may be used to configure the cRPDs 324. cRPD controller 720 may be a device/element management system, network management system, orchestrator, a user interface/CLI, or other controller. cRPDs 324 run routing protocols and exchange routing protocol messages with routers, including other cRPDs 324. Each of cRPDs 324 may be a containerized routing protocol process and effectively operates as a software-only version of a router control plane.

The enhanced underlay routing provided by cRPD 324 may replace the default gateway at the forwarding plane and provide a rich routing stack for use cases that can be supported. In some examples that do not use cRPD 324, virtual router 506 will rely on the default gateway for underlay routing. In some examples, cRPD 324 as the underlay routing process will be restricted to program only the default inet(6).0 fabric with control plane routing information. In such examples, non-default overlay VRE's may be programmed by control nodes 232.

In this context, telemetry exporter 561 may execute to collect and export metrics data to telemetry node 560, which may represent an example of telemetry node 60/260. Telemetry exporter 561 may interface with agents executing in virtual router 506 (which are not shown for ease of illustration purposes) and underlying physical hardware to collect one or more metrics in the form of metrics data. Telemetry exporter 561 may be configured according to TECD to collect only specific metrics that are less than all of the metrics to improve operation of SDN architecture 700.

Figure 7:
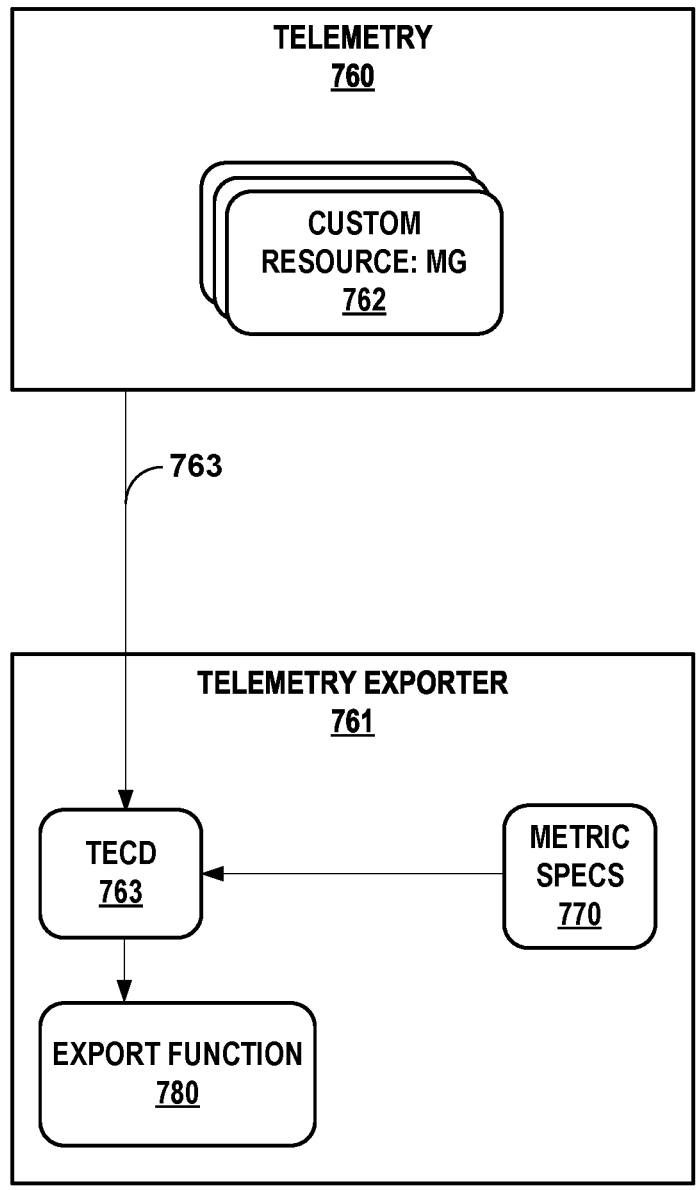
FIG. 7 is a block diagram illustrating the telemetry node and telemetry exporter from FIGS. 1-5A in more detail.

FIG. 7 is a block diagram illustrating the telemetry node and telemetry exporter from FIGS. 1-5A in more detail. In the example of FIG. 7, telemetry node 760 may represent an example of telemetry node 60 and 260, while telemetry exporter 761 may represent an example of telemetry exporter 61, 261, and 561.

Telemetry node 760 may define a number of custom resources as MGs 762 that conform to the containerized orchestration platform, e.g., Kubernetes. Telemetry node 760 may define these MGs 762 via)(ANIL in the manner described above in more detail. A network administrator or other user of this SDN architecture may interact, via UI 50 (as shown in FIG. 1) with telemetry node 760 to issue requests that enable and/or disable one or more of MGs 762. Telemetry node 760 may reduce enabled MGs 762 into a configuration mapping of enabled metrics, which is denoted as TECD 763. Telemetry node 760 may interface with telemetry exporter 761 to configure, based on TECD 763, telemetry exporter 761 to only export the enabled subset of metrics defined by the configuration mapping represented by TECD 763.

Telemetry exporter 761 may then configure, based on TECD 763, an active list of enabled metrics that limits export function 780 to only export enabled metrics specified by the configuration mapping denoted as TECD 763, Export function 780 may interface with various agents (again not show for ease of illustration purposes) to configure those agents to only collect the metrics specified by the configuration mapping. Export function 780 may then receive metric data for only the enabled metrics specified by TEM 763, which in turn results in export function 780 only exporting the enabled metrics in the form of metrics data, such as MD 64.

In other words, the system collects hundreds of telemetry metrics for CN2. The large number of metrics can affect performance and scalability of CN2 deployments and can affect network performance. Example metrics include data plane-related metrics (bytes/packets), resource (CPU, mem., storage) utilization, routing information—routes exchanged among peers, and many others.

However, various aspects of the techniques described in this disclosure provide for metric groups, which are a new Custom Resource that provide the user with runtime flexibility to define collections of telemetric metrics and to selectively enable/disable the export of such collections. Changes to a Metric Group are pushed to each cluster that has been selected for the Metric Group (by default, a Metric Group may apply to all clusters). A Telemetry Operator (which as noted above may represent a particular one of custom resource controllers 302) implements the reconciler for the Metric Group Custom Resource and builds a Configuration Map (which may be referred to as ConfigMap) from one or more MetricGroups that are to be applied to the selected clusters. The Telemetry Operator can then push the ConfigMap into the clusters. Metric Agents (e.g., vrouter agent in compute node or controller) monitors ConfigMap changes.

While all metrics may be collected and stored by the Metric Agents locally, the Metric Agents filter the metrics according to the enabled Metric Groups as indicated by the ConfigMap and exports, to a collector, only those metrics that belong to an enabled Metric Group.

Because Metric Group is a Custom Resource, instances of metric groups can be dynamically created, accessed, modified, or deleted through the Kubernetes API server, which automatically handles the configuration through reconciliation (as described above).

In some examples, some metric groups may be predefined by the network controller provider, a network provider, or other entity. A customer can optionally select certain of the predefined groups for enabling/disabling during installation or using the API. Example predefined groups may include those for controller-info, bgpaas, controller-xmpp, controller-peer, ipv4, ipv6, evpn, ermvpn, mvpn, vroute-rinfo, vrouter-cpu, vrouter-mein, vrouter-traffic, vrouter-ipv6, vrouter-vmi (interfaces), each of which has a relevant set of associated metrics.

In this way, Metric Groups provide a high-level abstraction absolving the user from configuring multiple of the different CN2 components (vrouter, controller, cn2-kubemanager, cRPD, etc.). The telemetry operator maintains a data model for the metrics and the Metric Groups and a separate association of various metrics to their respective, relevant components. The customer can manipulate which metrics are exported simply by configure the high-level Metric Groups, and the telemetry operator applies changes appropriately across different components based on the data model. The customer can also apply metric selections of different scopes or to different entities (e.g., different clusters) within the system. If a customer is experience an issue with one workload cluster and wants more detailed metrics from that cluster, the customer can select a cluster for one or more MetricGroups to allow the user to do that. In addition, the customer can select the appropriate MetricGroup (e.g., controller-xmpp or evpn) that may be relevant to the issue being experienced. Therefore, a customer that wants low-level details can enable:/select MetricGroups for a specific entity that requires troubleshooting, rather than enabling detailed metrics across the board.

Figure 8:
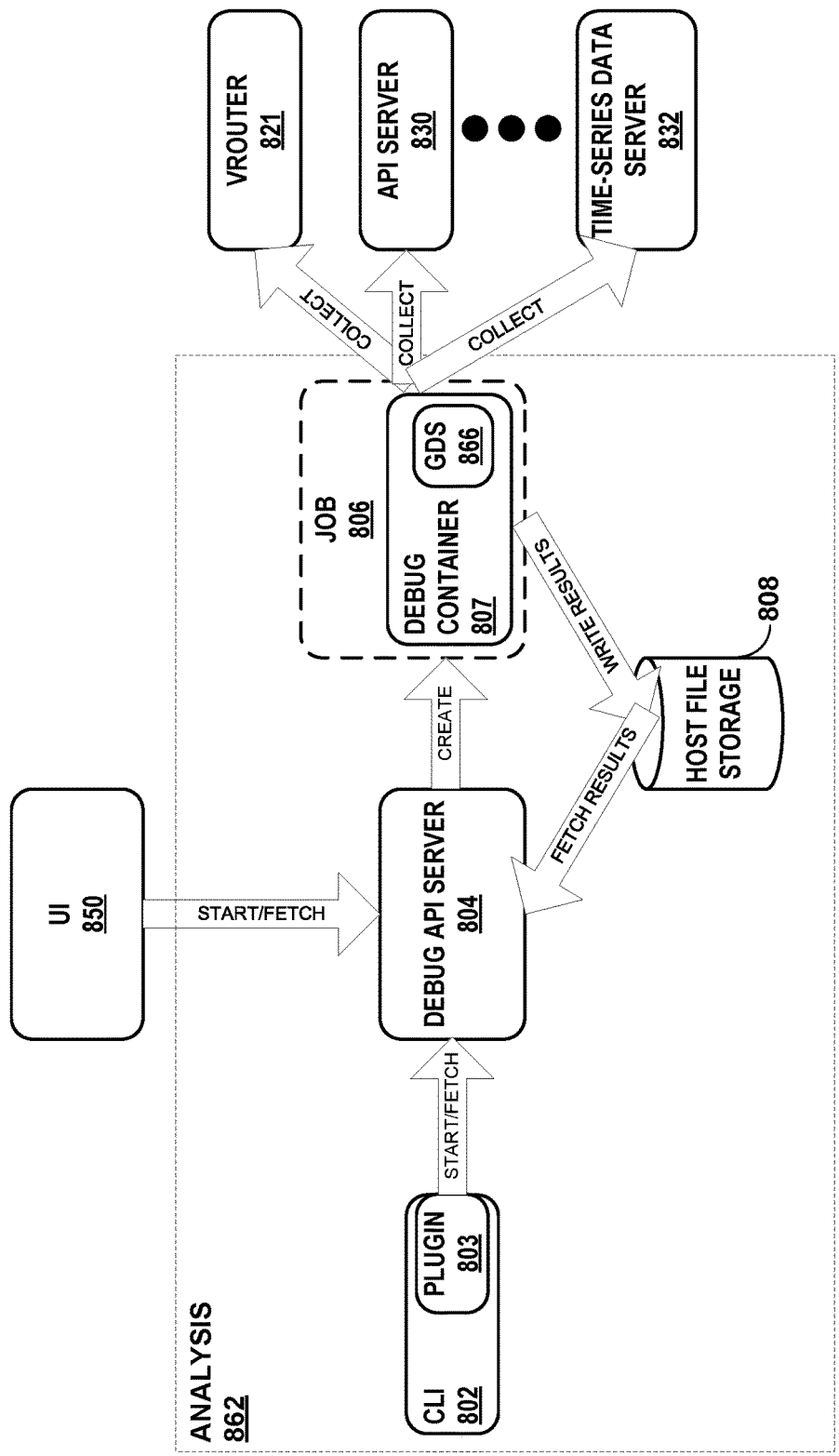
FIG. 8 is a block diagram illustrating, in more detail, an example of the analysis system shown in the example of FIG. 1.

FIG. 8 is a block diagram illustrating, in more detail, an example of the analysis system shown in the example of FIG. 1. Analysis system 862 may represent an example of analysis system 62 shown in the example of FIG. 1. As shown in the example of FIG. 8, analysis system 862 may include a command line interface ("CLI") 802 ("CLI 802"), a debug application programming interface (API) server 804 ("debug API server 804"), a depiction of job 806, and host file storage 808 (which may represent an example of a non-transitory computer-readable storage medium, such as a database or other types of storage).

CLI 802 may represent an interface with which a user (e.g., a network administrator) may input commands to invoke various functionality associated with analysis system 862. CLI 802 may include a plugin 803 by which to interface with debug API server 804 in order to start analysis and/or fetch results (shown as "start/fetch" in the example of FIG. 8) from a previous and/or current analysis. CLI 802 may receive commands that conform with the debug API exposed by plugin 803, which may be translated and/or transmitted via plugin 803 to debug API server 804.

Debug API server 804 may represent an example of API server 300 and/or custom API server 301, where debug API server 804 may extend API server 300 to expose debug (or, in other words, analysis) functionality. Debug API server 804 may initiate, responsive to commands from the user entered via CLI 802 by way of plugin 803 and/or via UI 850 (which may represent an example of UI 50 shown in the example of FIG. 1), job 806. Job 806 may represent a dedicated analysis task (which may also be referred to a "work") that debug API server 804 maintains in order to consolidate analysis results to a particular job, such as job 806.

Job 806 may include a unique identifier (e.g., a process identifier, sometimes denoted as "procID") along with other metadata used to distinguish one job from another job while also providing a link (which may be referred to as a pointer) to reserved job space within host file storage 808. Job 806 may also include a debug container 807 that represents a data structure for maintaining GDS 866, which may represent an example of GDS 66 shown in the example of FIG. 1. Debug container 807 may initially store OD 864 (which is not explicitly shown for ease of illustration purposes) that debug API server 804 operates on to form GDS 866. Considering that GDS 866 stores different aspects of OD 864, GDS 866 may also be referred to as OD 864.

In forming job 806, debug API server 804 may instantiate a number of routines by which to collect OD 864. Job 806 may then execute the routines to interface with different components of SDN architecture 8, such as a control component (shown as "vRouter 821" in the example of FIG. 8), a configuration component (shown as "API server 830"), and a telemetry component (shown as "time-series data server 832"), etc. Debug container 807 may collect OD 864 from these components and store OD 864 in allocated space within host file storage 808, which may represent a local store for OD 864, GDS 866, and/or results representative of potential issues.

Debug container 807 may traverse GDS 866 as described in detail throughout this disclosure. Debug container 807 may request a starting vertex of GDS 866 to determine how GDS 866 should be traversed. The user may define the starting vertex via CLI 802 (by way of commands) and/or graphically via UI 850 (and potentially after review a graphical representation of GDS 866). Debug container 807 may next process the starting vertex before potentially traversing to a subsequent vertex (potentially defined according to graph traversal algorithms) to identify potential issues premised upon the portions of OD 864 stored to each vertex of GDS 866. Debug container 807 may store the results to host file storage 808, which debug API server 804 may fetch (or otherwise obtain) to present via CLI 802 and/or UI 850.

As discussed above, the user may interface with one or more of CLI 802 and UI 850 to interact with debug API server 804 in order to initiate job 806 for a particular analysis task. In some instances, CLI 802 and/or UI 850 may provide various ways by which to interact with debug API server 804, including via a chatbot or other type of virtual assistant. The chatbot may be represented by plugin 803 and/or UI 850 and may enable the user to specify potential issues via dialogue-like and/or informal text (meaning the text does not necessarily need to conform to a formal syntax).

The chatbot may present various questions and or guided text that resembles a human expert while also significantly reducing the training for the end user (e.g., the network administrator of SDN architecture 8). The chatbot (which may also be referred to as a "chatbot interface") may enable interactions with the user to initiate, as some examples, obtaining OD 864 and/or output the potential issues in SDN architecture system 8.

In instances where analysis system 862 is maintained separate from SDN architecture 8 (e.g., on premise at a local enterprise that interfaces with SDN architecture 8 remotely), CLI 802 and/or UI 850 may prompt the user to enter user credentials (e.g., a username and password) for accessing SDN architecture 8. Debug API server 804 may then access, using the user credentials, SDN architecture 8 in order to obtain OD 864. Debug container 807 may then store OD 864 to local host file storage 808 (which is local to on premise analysis system 862). Debug container 807 may construct GDS 866 as discussed in more detail with respect to the example of FIG. 9.

Figure 9:
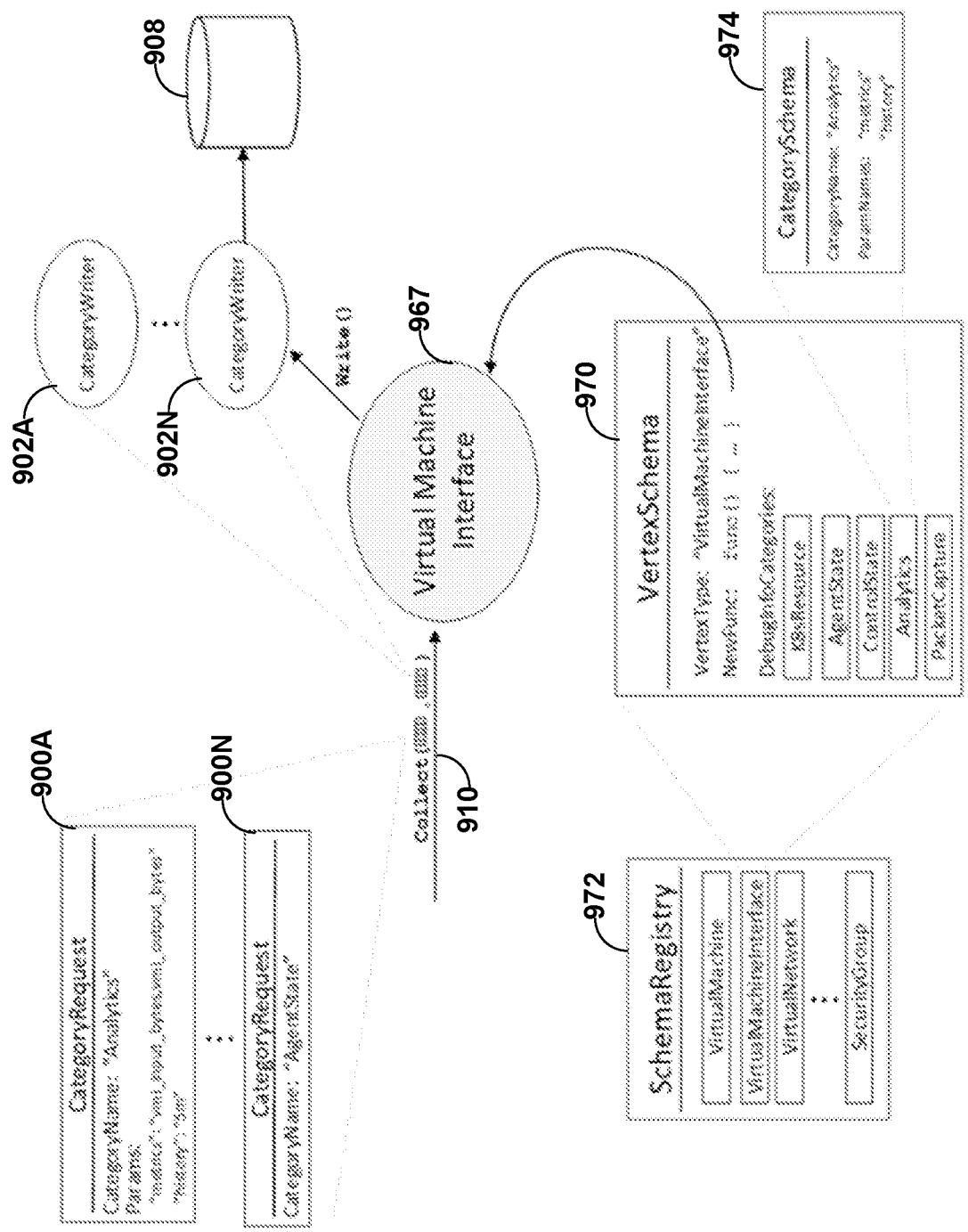
FIG. 9 is a diagram illustrating an example of how the analysis system shown in FIG. 1 constructs the graph data structure from the operational data in accordance with various aspects of the techniques described in this disclosure.

FIG. 9 is a diagram illustrating an example of how the analysis system shown in FIG. 1 constructs the graph data structure from the operational data in accordance with various aspects of the techniques described in this disclosure. As shown in the example of FIG. 9, debug container 807 may include a number of category requests 900A-900N ("category requests 900"), where each request includes a category name (e.g., analytics and/or agent state) along with parameters to collect (e.g., metrics, VMI inputs bytes, VMI output bytes, history, and a duration—e.g., 5 minutes ("5 m")).

Via CLI 802 and/or UI 850, the user may identify potential issues that result in various category requests 900. Each category type identified by category requests 900 (e.g., by category name) may define a corresponding category writer 902A-902N ("category writers 902"). Category writers 902 may represent routines that write OD 864 to local data store (which is another way to refer to host file storage, such as host file storage 808 shown in the example of FIG. 8) 908.

In the example of FIG. 9, debug container 807 may perform analytics per analytics category request 900A with respect to a virtual machine interface (VMI). Debug container 807 may specify a vertex 967 of GDS 866 that represents OD 864 for a VMI associated with the user's partition of SDN architecture 8. Debug container 807 may execute routines defined within category request 900A to initiate a collect 910 of OD 864 for VMI represented by vertex 967. A corresponding one of category writers 902 (i.e., category writer 902A in the example of VMI analytics) to write OD 864 to local data store 908.

To identify dependencies to/from the VMI, debug container 907 may also collect vertex schema 970, which is defined according to schema registry 972. Schema registry 972 may define a number of different vertex schemas for different nodes of SDN architecture 8 (such as VMs, VMIs, VNs, security groups—SG, etc.). Each vertex schema identifies a vertex type by name (e.g., "VirtualMachineInterface"), a function by function name (e.g., func( ) { . . . }, where the ellipses denote function code), and debug information categories (e.g., Kubernetes resources, agent state, control state, analytics, packet capture, etc.). Debug container 807 may also reference category schemas 974 that each define a category name (e.g., "Analytics") and parameter names (e.g., "metrics," "history," etc.) for a corresponding debug information category. Debug container 807 may traverse a vertex schema 970 to identify OD 864 to collect along with various dependencies between different vertex types, constructing GDS 866 in an iterative manner that possibly limits graph depth via thresholding as described above (so as to potentially limit graph vertex/edge explosion).

In this manner, debut container 807 may construct GDS 866 to represent OD 864 in a structured traversable manner. Debug container 807 may maintain GDS 866 in the form of a vertex directory. An example of such vertex directory is provided below:

Graph.json
Virtual Machine
Cluster-Local-system-XXX
Resource

-continued

Agent State
Control State
Virtual Machine Interface
System-YYY
Resource
Agent State
Control State
Analytics
Packet Capture
System-ZZZ
Resource
Agent State
Control State
Analytics
Packet Capture This directory may define that Virtual Machine vertex has dependencies to a Cluster-Local-System-XXX vertex, a Virtual Machine Interface vertex, etc., where the Virtual Machine Interface vertex also has dependencies to a System-YYY vertex and a System-ZZZ vertex. Each vertex also identifies which portion of OD 864 to collect, such as OD 864 representative of one or more of resource, agent state, control state, analytics, and/or packet capture.

In this way, debug container 807 may traverse OD 864 to identify a first portion of OD 864, a second portion of OD 864, and a dependency between the first portion of OD 864 (represented as vertex 967) and the second portion of OD 864. Debug container 807 may next construct GDS 866 that includes a first vertex defining the first portion of OD 864, a second vertex defining the second portion of OD 864, and an edge between the first vertex and the second vertex defining the dependency between the first portion of OD 864 data and the second portion of OD 864.

Figure 10:
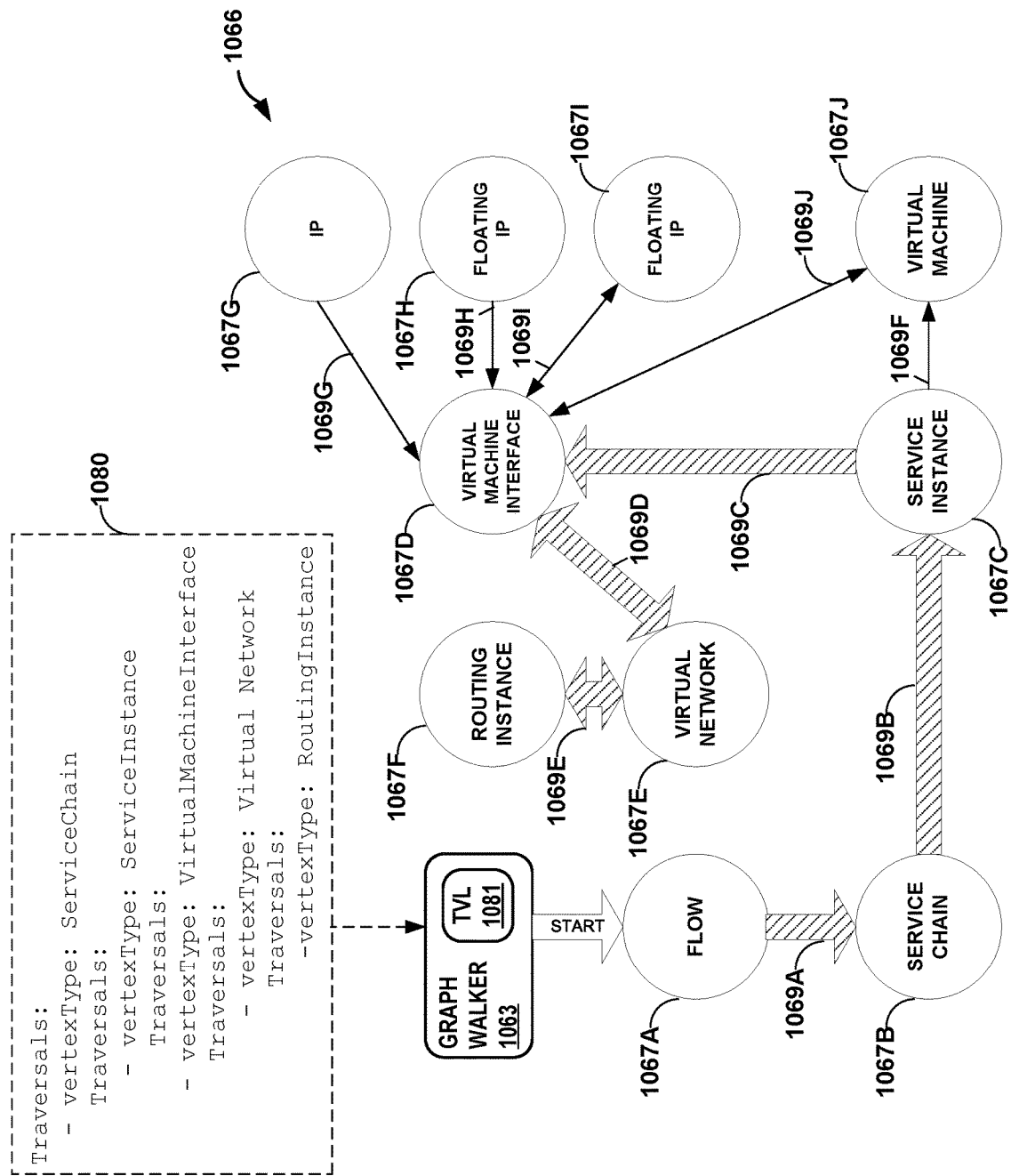
FIG. 10 is a diagram illustrating an example of the analysis system shown in FIG. 1 traversing the graph data structure to identify potential issues impacting the software-defined networking architecture according to various aspects of the techniques described in this disclosure.

FIG. 10 is a diagram illustrating an example of the analysis system shown in FIG. 1 in traversing the graph data structure to identify potential issues impacting the software-defined networking architecture according to various aspects of the techniques described in this disclosure. In the example of FIG. 10, a graph data structure (GDS) 1066 may represent one example of GDS 66. GDS 1066 includes vertexes 1067A-1067J ("vertexes 1067") interconnected by various edges 1069A-1069J ("edges 1069"). In some instances, edges 1069 may include single directional edges, such as edges 1069A-1069C, 1069F, 1069G, and 1069H, while other edges 1069 may include bidirectional edges, such as edges 1069D, 1069E, 1069I, and 1069J.

Analysis system 862 may include a graph walker 1063 as part of debug container 807, which may traverse GDS 1066. The user may, as noted above, select a starting vertex, which in this instance is vertex 1067A. Optionally, as denoted by the dashed lines, graph walker 1063 may obtain a configuration 1080 that identifies a traversal path for GDS 1066. Configuration 1080 may be developed based on past manual debugging of SDN architecture 8 and/or via expert analysis of SDN architectures to investigate and identify potential issues impacting SND architectures. Configuration 1080 defines the traversal path in this instances as moving from vertex 1067A to vertex 1067B, next to vertex 1067C, and followed by vertexes 1067D, 1067E, and 1067F (in this order).

Graph walker 1063 may traverse from vertex 1067A processing any OD 864 obtained for the "flow" object (where flow refers to a packet flow typically identified by the corresponding 5-tuple) as discussed above generally with respect to vertex 967 in the example of FIG. 9. After finishing processing of vertex 1067A, graph walker 1063 may traverse edge 1069A to vertex 1067B, processing any OD 864 obtained for the "service chain" object. Graph walker 1063 may continue in this manner, traversing dependencies 1069B, 1069C, 1069D, and 1069F, processing any OD 864 represented by vertexes 1067C (associated with a "service instance" object), 1067D (associated with a "virtual machine interface" object), 1067E (associated with a "virtual network" object), and 1067F (associated with a "routing instance" object). In each instance, graph walker 1063 may identify potential issues with one or more portions of OD 864 associated with one or more of vertexes 1067.

Given that graph data structures do not typically have a root node (unlike most tree data structures which are a subset of graph data structures) and may include loops in which graph walker 1063 may hang by endlessly looping through vertexes, graph walker 1063 may maintain a traversed vertex list (TVL) 1081 ("TVL 1081") that identifies which of vertexes 1067 of GDS 1066 have been processed. Graph walker 1063 may determine, before processing each of vertexes 1067 whether any one of vertexes 1067 that graph walker 1063 is about to process is included in TVL 1081.

That is, graph walker 1063 may add, when processing each of vertexes 1067A-1067F, each of vertexes 1067A-1067F to TVL 1081. Each of vertexes 1067 may include a unique identifier, name, or other convention that uniquely identifies each of vertexes 1067. Graph walker 1063 may add this unique identifier for each of vertexes 1067A-1067F to the list after processing any OD 864 associated with each of vertexes 1067A-1067F. Were graph walker 1063 to return to one of vertexes 1067A-1067F, graph walker 1063 first determines whether the one of vertexes 1067A-1067F are included in TVL 1081. Responsive to determining that the one of vertexes 1067A-1067F is included in TVL 1081, graph walker 1063 may refrain from processing any other vertex 1067 of GDS 1066.

In any event, once graph walker 1063 processes one or more of vertexes 1067, graph walker 1063 may output any potential issues (e.g., failed nodes, misconfigured nodes, etc.) to local data store 808. Debug API server 804 may then fetch the potential issues and present, via CLI 802 and/or UI 850, the potential issues impacting SND architecture 8.

Figure 11:
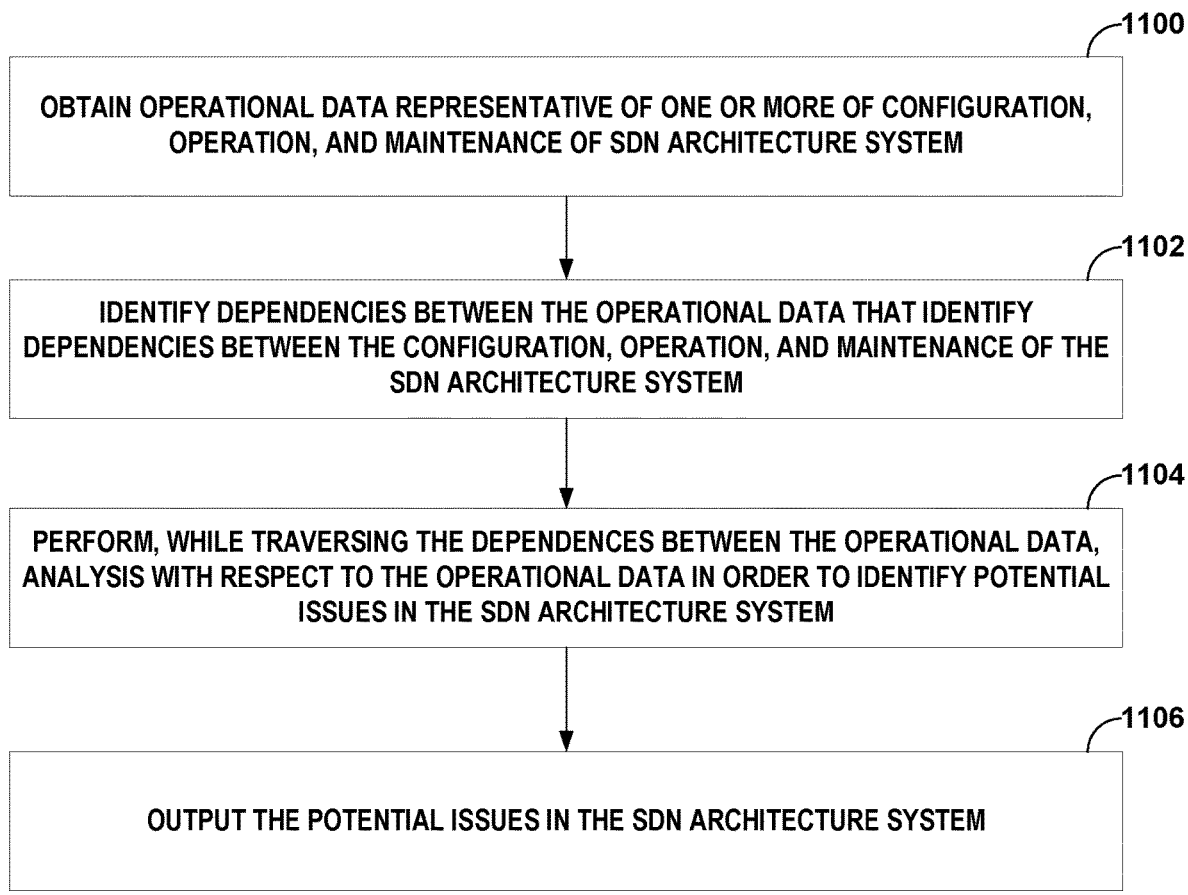
FIG. 11 is a flowchart illustrating operation of the computer architecture shown in the example of FIG. 1 performing various aspects of the techniques described herein.

FIG. 11 is a flowchart illustrating operation of the computer architecture shown in the example of FIG. 1 in performing various aspects of the techniques described herein. As shown in the example of FIG. 11, analysis system 62 may obtain OD 64 representative of one or more of configuration, operation, and maintenance of the SDN architecture 8 (1100). For example, SDN architecture 8 may support a first virtual network (denoted "VN1" for purposes of example) in which there is a potential routing issue impacting connectivity between nodes and/or pods interfacing with the VN1. Via UI 50, the user may interface with network controller 24 to initiate a root cause analysis with respect to the VN1. Network controller 24 may invoke analysis system 8 to perform the root cause analysis, passing VN1 as having potential issues.

Analysis system 8 may, responsive to receiving VN1, interface with network controller 24 to collect OD 64 concerning VN1, including a configuration map defining how VN1 is configured. Analysis system 62 may also interface with telemetry node 60 to obtain additional OD 64 in the form of metric data representative of operation and maintenance of VN1. Analysis system 62 may also interface with control node 32 to obtain additional OD 64 in control data representative of control information provided with respect to VN1 (such as routing information to enable various nodes and/or pods to support VN1).

Analysis system 62 may next identify dependencies between OD 64 that identify dependencies between the configuration, operation, and maintenance of SDN architecture 8 (1102). Analysis system 62 construct GDS 66 to define the dependencies between various portions of OD 64. Given that a number of different aspects of configuration data within OD 64 may be schema objects in which dependencies were previously defined when configuring (in this example) VN1. Analysis system 62 may then construct GDS 66 based on the schema objects to add dependencies (which are edges in terms of GDS 66) between various vertexes representative of portions of OD 64.

In some instances, the user and/or analysis system 62 may define dependency limits to how many dependencies should be included in GDS 66 in order to limit and/or reduce a size of GDS 66. Analysis system 62 may include templates that define these dependency limits based on a type of potential issue impacting SDN architecture 8. In this example of potential routing issues in VINT, analysis system 62 may define a limit of one or two dependencies, where such dependency limits may be premised on past manual inspection of potential issues with VNs executing within SDN architectures (which may include SDN architecture 8).

After constructing GDS 66, analysis system 62 may then perform, while traversing the dependences between OD 64, analysis with respect to OD 64 in order to identify potential issues SDN architecture 8 (which in this instance are specific to VN1) (1104). Analysis system 62 may traverse vertexes of GDS 66 via the edges (representative of the dependencies) in a defined walk. The user may interface with UI to specify how analysis system 62 is to traverse (or, in other words, "walk") GDS 66. In addition or as an alternative, analysis system 62 may traverse GDS 66 according to the templates defined above, which may specify a starting vertex that should form the start of the traversal of GDS 66.

When traversing GDS 66, analysis system 62 may perform a number of different types of verification. Analysis system 62 may process one or more vertexes of GDS 66 representative of a portion of OD 64 to perform configuration verification that verifies all configuration nodes, control nodes, and/or compute nodes relevant to VN1. Analysis system 62 may also perform operational state verification with respect to one or more vertexes of GDS 66 to verify an operational state of control nodes, compute nodes, etc. in terms of states, errors, metrics data, monitoring data, global monitoring data for SDN architecture 8, and any other operational data relevant to VN1. Analysis system 62 may also perform analytics verification to ensure that various UVEs, object logs, and/or metrics data relevant to VN1 are within various analytical thresholds. Via these various types of verification, analysis system 62 may identify configuration errors, control errors, operational errors (e.g., potentially based on analytics data, such as object logs, metrics data, etc.). These errors may represent potential issues in SDN architecture 8 that, in this instance, are possibly impacting VN1.

Analysis system 62 may then interface with network controller 24, passing the potential issues to network controller 24. Network controller 24 may then output (e.g., via IR 50) the potential issues in the SDN architecture 8 (which in this example may relate to VN1). Although described as outputting the potential issues via network controller 24, analysis system 62 may operate as a separate system from network controller 24 and may be configured to output the potential issues directly via a command line interface and/or a user interface (1106).

In this way, various aspects of the techniques may enable the following examples.

Example 1. An analysis system for a software-defined networking (SDN) architecture system, the analysis system comprising: processing circuitry configured to: obtain operational data representative of one or more of configuration, operation, and maintenance of the SDN architecture system; identify dependencies between the operational data that identify dependencies between objects representative of the configuration, operation, and maintenance of the SDN architecture system; perform, while traversing the dependences between the operational data, analysis with respect to the operational data in order to identify potential issues in the SDN architecture system; and output the potential issues in the SDN architecture system.

Example 2. The analysis system of example 1, wherein the SDN architecture system includes one or more of a configuration component, a control component, a compute component, and a telemetry component, and wherein the analysis system interfaces with one or more of the configuration component, the control component, the compute component, and the telemetry component to collect the operational data.

Example 3. The analysis system of example 2, further comprising a memory configured to locally store the operational data and a representation of the potential issues.

Example 4. The analysis system of any combination of examples 1-3, wherein the operational data includes schemas for configuration objects defining the configuration for the SDN architecture system, and wherein to identify the dependencies between the operational data, the processing circuitry is configured to process the schemas for the configuration objects to identify the dependencies between the configuration objects.

Example 5. The analysis system of any combination of examples 1-4, wherein the processing circuitry is further configured to: traverse the operational data to identify a first portion of the operational data, a second portion of the operational data, and a dependency between the first portion of the operational data and the second portion of the operational data; and construct a graph data structure that includes a first vertex defining the first portion of the operational data, a second vertex defining the second portion of the operational data, and an edge between the first vertex and the second vertex defining the dependency between the first portion of the operational data and the second portion of the operational data.

Example 6. The analysis system of example 5, wherein the processing circuitry is, when configured to perform the analysis, configured to: process, when traversing the graph data structure, the first vertex to identify the potential issues associated with first portion of the operational data; and process, when traversing the graph data structure and after processing the first vertex, the second vertex to identify the potential issues with the second portion of the operational data.

Example 7. The analysis system of example 5, wherein the processing circuitry is, when configured to perform the analysis, configured to: maintain a traversed vertex list that identifies which vertexes of the graph data structure have been processed; determine, before processing the first vertex, whether the first vertex is included in the traversed vertex list; and refrain, responsive to determining that the first vertex is included in the traversed vertex list, from processing any other vertex of the graph data structure.

Example 8. The analysis system of any combination of examples 1-7, wherein to output the potential issues, the processing circuitry is configured to present, via a user interface, the potential issues in the SDN architecture system.

Example 9. The analysis system of any combination of examples 1-8, wherein the processing circuitry presents a chatbot interface configured to enable interactions with a user to initiate obtaining the operational data and outputting the potential issues in the SDN architecture system.

Example 10. The analysis system of any combination of examples 1-9, wherein to perform the analysis, the processing circuitry is configured to perform a root cause analysis with respect to the operational data in order to identify the potential issues in the SDN architecture system.

Example 11. The analysis system of any combination of examples 1-10, wherein the analysis system is separate from the SDN architecture system, and wherein to obtain the operational data, the processing circuitry is configured to: obtain user credentials for accessing the SDN architecture system; and access, using the user credentials, the SDN architecture system to obtain the operational data, and wherein the analysis system includes a local memory configured to store the operational data.

Example 12. The analysis system of any combination of examples 1-12, wherein the SDN architecture system includes a network controller comprising the processing circuitry that is configured to execute the analysis system.

Example 13. A method for an analysis node configured to analyze a software-defined networking (SDN) architecture system, the method comprising: obtaining, by processing circuitry, operational data representative of one or more of configuration, operation, and maintenance of the SDN architecture system; identifying, by the processing circuitry, dependencies between the operational data that identify dependencies between the configuration, operation, and maintenance of the SDN architecture system; performing, by the processing circuitry and while traversing the dependences between the operational data, analysis with respect to the operational data in order to identify potential issues in the SDN architecture system; and outputting, by the processing circuitry, the potential issues in the SDN architecture system.

Example 14. The method of example 13, wherein the SDN architecture system includes one or more of a configuration component, a control component, a compute component, and a telemetry component, and wherein obtaining the operational data comprises interfacing with one or more of the configuration component, the control component, the compute component, and the telemetry component to collect the operational data.

Example 15. The method of example 14, further comprising locally storing the operational data and a representation of the potential issues.

Example 16. The method of any combination of examples 13-15, wherein the operational data includes schemas for configuration objects defining the configuration for the SDN architecture system, and wherein identifying the dependencies between the operational data comprises processing the schemas for the configuration objects to identify the dependencies between the configuration objects.

Example 17. The method of any combination of examples 13-16, further comprising: traversing the operational data to identify a first portion of the operational data, a second portion of the operational data, and a dependency between the first portion of the operational data and the second portion of the operational data; and constructing a graph data structure that includes a first vertex defining the first portion of the operational data, a second vertex defining the second portion of the operational data, and an edge between the first vertex and the second vertex defining the dependency between the first portion of the operational data and the second portion of the operational data.

Example 18. The method of example 17, wherein performing the analysis comprises: processing, when traversing the graph data structure, the first vertex to identify the potential issues associated with first portion of the operational data; and processing, when traversing the graph data structure and after processing the first vertex, the second vertex to identify the potential issues with the second portion of the operational data.

Example 19. The method of example 17, wherein performing the analysis: maintaining a traversed vertex list that identifies which vertexes of the graph data structure have been processed; determining, before processing the first vertex, whether the first vertex is included in the traversed vertex list; and refraining, responsive to determining that the first vertex is included in the traversed vertex list, from processing any other vertex of the graph data structure.

Example 20. A non-transitory computer-readable storage medium having instructions stored thereon that, when executed, cause one or more processors of an analysis node for analyzing a software-defined networking (SDN) architecture system to: obtain operational data representative of one or more of configuration, operation, and maintenance of the SDN architecture system; identify dependencies between the operational data that identify dependencies between the configuration, operation, and maintenance of the SDN architecture system; perform, while traversing the dependences between the operational data, analysis with respect to the operational data in order to identify potential issues in the SDN architecture system; and output the potential issues in the SDN architecture system.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. An analysis system for a software-defined networking (SDN) architecture system, the analysis system comprising:
   processing circuitry configured to:
   obtain operational data representative of one or more of configuration, operation, and maintenance of the SDN architecture system;
   identify dependencies between the operational data that identify dependencies between objects representative of the configuration, operation, and maintenance of the SDN architecture system, wherein the processing circuitry is configured to identify the dependencies by at least in part traversing the operational data to identify a first portion of the operational data, a second portion of the operational data, and a dependency between the first portion of the operational data and the second portion of the operational data;
   construct a graph data structure that includes a first vertex defining the first portion of the operational data, a second vertex defining the second portion of the operational data, and an edge between the first vertex and the second vertex defining the dependency between the first portion of the operational data and the second portion of the operational data;
   perform, while traversing the dependences between the operational data in the graph data structure, analysis with respect to the operational data in order to identify potential issues in the SDN architecture system; and
   output an indication of the potential issues in the SDN architecture system.

2. The analysis system of claim 1,
   wherein the SDN architecture system includes one or more of a configuration component, a control component, a compute component, and a telemetry component, and
   wherein the analysis system interfaces with one or more of the configuration component, the control component, the compute component, and the telemetry component to collect the operational data.

3. The analysis system of claim 2, further comprising a memory configured to locally store the operational data and a representation of the potential issues.

4. The analysis system of claim 1,
   wherein the operational data includes schemas for configuration objects defining the configuration for the SDN architecture system, and
   wherein to identify the dependencies between the operational data, the processing circuitry is configured to process the schemas for the configuration objects to identify the dependencies between the configuration objects.

5. The analysis system of claim 1, wherein the processing circuitry is, when configured to perform the analysis, configured to:
process, when traversing the graph data structure, the first vertex to identify the potential issues associated with first portion of the operational data; and
process, when traversing the graph data structure and after processing the first vertex, the second vertex to identify the potential issues with the second portion of the operational data.

6. The analysis system of claim 1, wherein the processing circuitry is, when configured to perform the analysis, configured to:
maintain a traversed vertex list that identifies which vertexes of the graph data structure have been processed;
determine, before processing the first vertex, whether the first vertex is included in the traversed vertex list; and
refrain, responsive to determining that the first vertex is included in the traversed vertex list, from processing any other vertex of the graph data structure.

7. The analysis system of claim 1, wherein to output the potential issues, the processing circuitry is configured to present, via a user interface, the potential issues in the SDN architecture system.

8. The analysis system of claim 1, wherein the processing circuitry presents a chatbot interface configured to enable interactions with a user to initiate obtaining the operational data and outputting the potential issues in the SDN architecture system.

9. The analysis system of claim 1, wherein to perform the analysis, the processing circuitry is configured to perform a root cause analysis with respect to the operational data in order to identify the potential issues in the SDN architecture system.

10. The analysis system of claim 1,
wherein the analysis system is separate from the SDN architecture system, and
wherein to obtain the operational data, the processing circuitry is configured to:
obtain user credentials for accessing the SDN architecture system; and
access, using the user credentials, the SDN architecture system to obtain the operational data, and
wherein the analysis system includes a local memory configured to store the operational data.

11. The analysis system of claim 1, wherein the SDN architecture system includes a network controller comprising the processing circuitry that is configured to execute the analysis system.

12. A method for an analysis node configured to analyze a software-defined networking (SDN) architecture system, the method comprising:
obtaining, by processing circuitry, operational data representative of one or more of configuration, operation, and maintenance of the SDN architecture system;
identifying, by the processing circuitry, dependencies between the operational data that identify dependencies between the configuration, operation, and maintenance of the SDN architecture system, wherein identifying the dependencies includes traversing the operational data to identify a first portion of the operational data, a second portion of the operational data, and a dependency between the first portion of the operational data and the second portion of the operational data;
constructing a graph data structure that includes a first vertex defining the first portion of the operational data, a second vertex defining the second portion of the operational data, and an edge between the first vertex and the second vertex defining the dependency between the first portion of the operational data and the second portion of the operational data;
performing, by the processing circuitry and while traversing the dependences between the operational data in the graph data structure, analysis with respect to the operational data in order to identify potential issues in the SDN architecture system; and
outputting, by the processing circuitry, an indication of the potential issues in the SDN architecture system.

13. The method of claim 12,
wherein the SDN architecture system includes one or more of a configuration component, a control component, a compute component, and a telemetry component, and
wherein obtaining the operational data comprises interfacing with one or more of the configuration component, the control component, the compute component, and the telemetry component to collect the operational data.

14. The method of claim 13, further comprising locally storing the operational data and a representation of the potential issues.

15. The method of claim 12,
wherein the operational data includes schemas for configuration objects defining the configuration for the SDN architecture system, and
wherein identifying the dependencies between the operational data comprises processing the schemas for the configuration objects to identify the dependencies between the configuration objects.

16. The method of claim 12, wherein performing the analysis comprises:
processing, when traversing the graph data structure, the first vertex to identify the potential issues associated with first portion of the operational data; and
processing, when traversing the graph data structure and after processing the first vertex, the second vertex to identify the potential issues with the second portion of the operational data.

17. The method of claim 12, wherein performing the analysis:
maintaining a traversed vertex list that identifies which vertexes of the graph data structure have been processed;
determining, before processing the first vertex, whether the first vertex is included in the traversed vertex list; and
refraining, responsive to determining that the first vertex is included in the traversed vertex list, from processing any other vertex of the graph data structure.

18. A non-transitory computer-readable storage medium having instructions stored thereon that, when executed, cause one or more processors of an analysis node for analyzing a software-defined networking (SDN) architecture system to:
obtain operational data representative of one or more of configuration, operation, and maintenance of the SDN architecture system;
identify dependencies between the operational data that identify dependencies between the configuration, operation, and maintenance of the SDN architecture system, wherein to identify the dependencies, the instructions, when executed, cause the one or more processors to at least in part traverse the operational data to identify a first portion of the operational data, a second portion of the operational data, and a dependency between the first portion of the operational data and the second portion of the operational data;

construct a graph data structure that includes a first vertex defining the first portion of the operational data, a second vertex defining the second portion of the operational data, and an edge between the first vertex and the second vertex defining the dependency between the first portion of the operational data and the second portion of the operational data;

perform, while traversing the dependences between the operational data in the graph data structure, analysis with respect to the operational data in order to identify potential issues in the SDN architecture system; and output an indication of the potential issues in the SDN architecture system.

* * * * *